(12) United States Patent
Trend et al.

(10) Patent No.: US 10,054,436 B2
(45) Date of Patent: Aug. 21, 2018

(54) SYSTEMS AND METHODS FOR GENERATING PATHS FOR PROCESSING PHYSICAL PROFILES OF PARTS

(71) Applicant: The Boeing Company, Chicago, IL (US)

(72) Inventors: Don D. Trend, Huntington Beach, CA (US); Martin Hanna Guirguis, Long Beach, CA (US)

(73) Assignee: The Boeing Company, Chicago, IL (US)

( * ) Notice: Subject to any disclaimer, the term of this patent is extended or adjusted under 35 U.S.C. 154(b) by 319 days.

(21) Appl. No.: 14/857,753

(22) Filed: Sep. 17, 2015

(65) Prior Publication Data
US 2017/0082428 A1  Mar. 23, 2017

(51) Int. Cl.
| | |
|---|---|
| *G01B 3/22* | (2006.01) |
| *G01B 5/20* | (2006.01) |
| *G01B 7/28* | (2006.01) |
| *G01B 11/24* | (2006.01) |
| *G01B 13/16* | (2006.01) |
| *G01G 15/04* | (2006.01) |
| *G01B 17/06* | (2006.01) |

(Continued)

(52) U.S. Cl.
CPC ............. *G01B 21/20* (2013.01); *B23Q 17/00* (2013.01); *G05B 19/00* (2013.01)

(58) Field of Classification Search
CPC ........ B64D 43/00; B64D 43/02; B64D 15/20; B64D 1/16; B64D 45/00; B64D 45/08; B64C 39/024; B64C 13/16; B64C 1/061; B64C 1/064; B64C 2201/084; B64C 23/065; G06F 17/5081; G06F 2217/12; G06F 3/013
See application file for complete search history.

(56) References Cited

U.S. PATENT DOCUMENTS

| | | | | |
|---|---|---|---|---|
| 5,510,709 A | * | 4/1996 | Hurley | ............... G01N 27/9013 324/225 |
| 5,801,312 A | * | 9/1998 | Lorraine | .............. G01N 29/069 600/443 |

(Continued)

OTHER PUBLICATIONS

Agapakis, John E. , "Vision-Aided Robotic Welding: An Approach and a Flexible Implementation", The International Journal of Robotics Research, vol. 9, No. 5, Oct. 1990, 1 pg.

(Continued)

*Primary Examiner* — Roy Y Yi
(74) *Attorney, Agent, or Firm* — Kwan & Olynick LLP

(57) ABSTRACT

A method of generating a path for processing a physical profile of a part with a tool is provided. The physical profile has a shape. The method comprises identifying a processing location on the physical profile of the part. The processing location is within an inspection region. The method also comprises identifying an inspection-region location based on the processing location. An inspection region is geometrically associated with the inspection-region location. The method additionally comprises identifying a processing location on the physical profile of the part. The processing location is within the inspection region. The method also comprises generating at least a portion of the path based on the processing location and the processing location.

20 Claims, 21 Drawing Sheets

(51) Int. Cl.
*G01B 21/20* (2006.01)
*B23Q 17/00* (2006.01)
*G05B 19/00* (2006.01)

(56) References Cited

U.S. PATENT DOCUMENTS

| | | | | |
|---|---|---|---|---|
| 8,013,600 B1* | 9/2011 | Yepez, III | .......... | G01N 27/9033 |
| | | | | 324/240 |
| 2003/0135285 A1* | 7/2003 | Osterkamp | ........ | G01N 29/2418 |
| | | | | 700/11 |
| 2011/0000299 A1* | 1/2011 | Isobe | .................. | G01N 29/221 |
| | | | | 73/625 |
| 2012/0207379 A1* | 8/2012 | Shimodaira | .............. | G06K 9/34 |
| | | | | 382/141 |
| 2014/0095085 A1* | 4/2014 | Fetzer | ................. | G01N 29/043 |
| | | | | 702/56 |
| 2015/0234945 A1* | 8/2015 | Marceau | ............. | G06F 17/5004 |
| | | | | 703/1 |

OTHER PUBLICATIONS

Davancens, Angelica et al., "Systems and Methods for Dispensing a Substance on a Surface", U.S. Appl. No. 14/291,216, filed May 30, 2014, 45 pgs.
Kim, Pyunghyun et al., "Automatic teaching of welding robot for free-formed seam using laser vision sensor", Optics and Lasers in Engineering, 31, 1999, pp. 173-182.

* cited by examiner

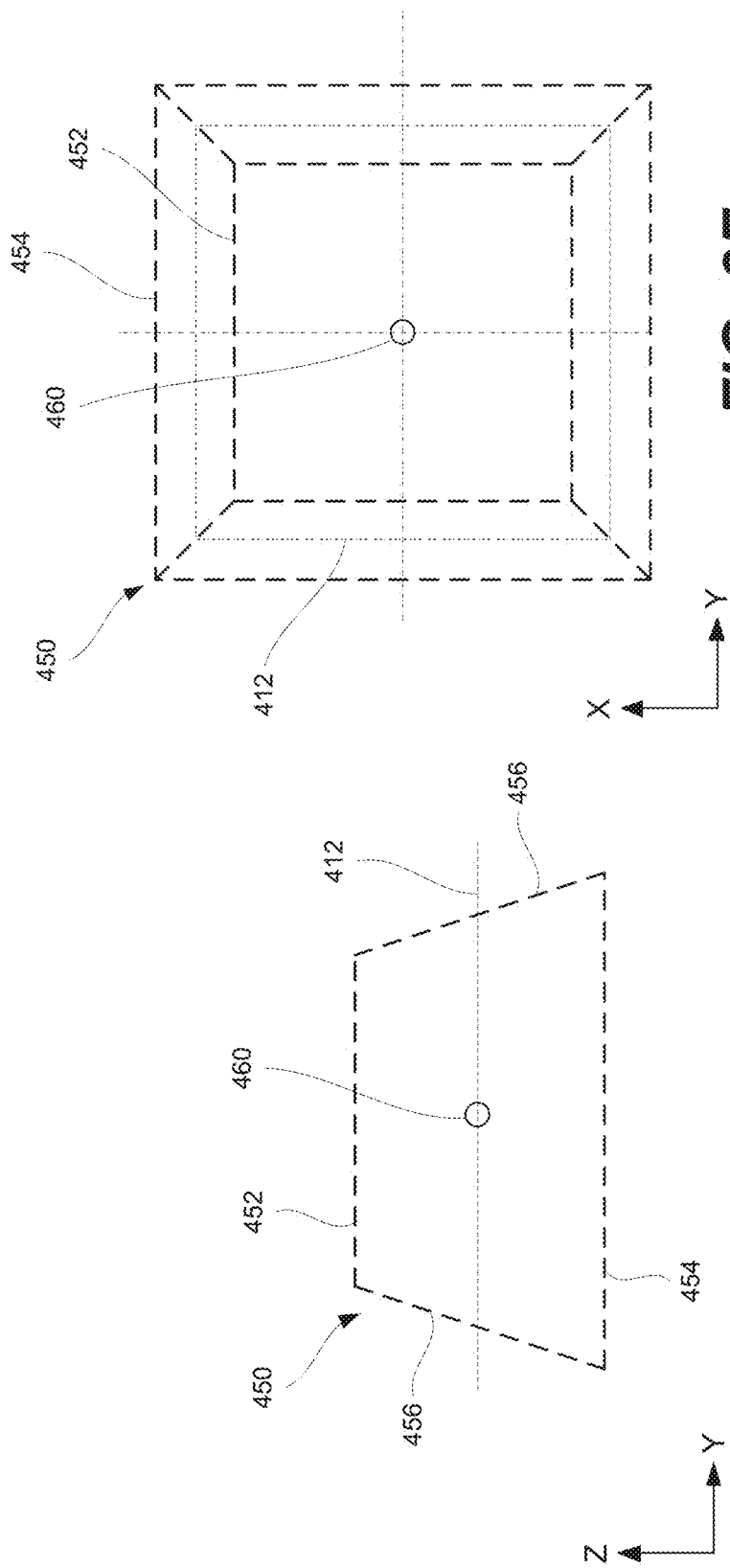

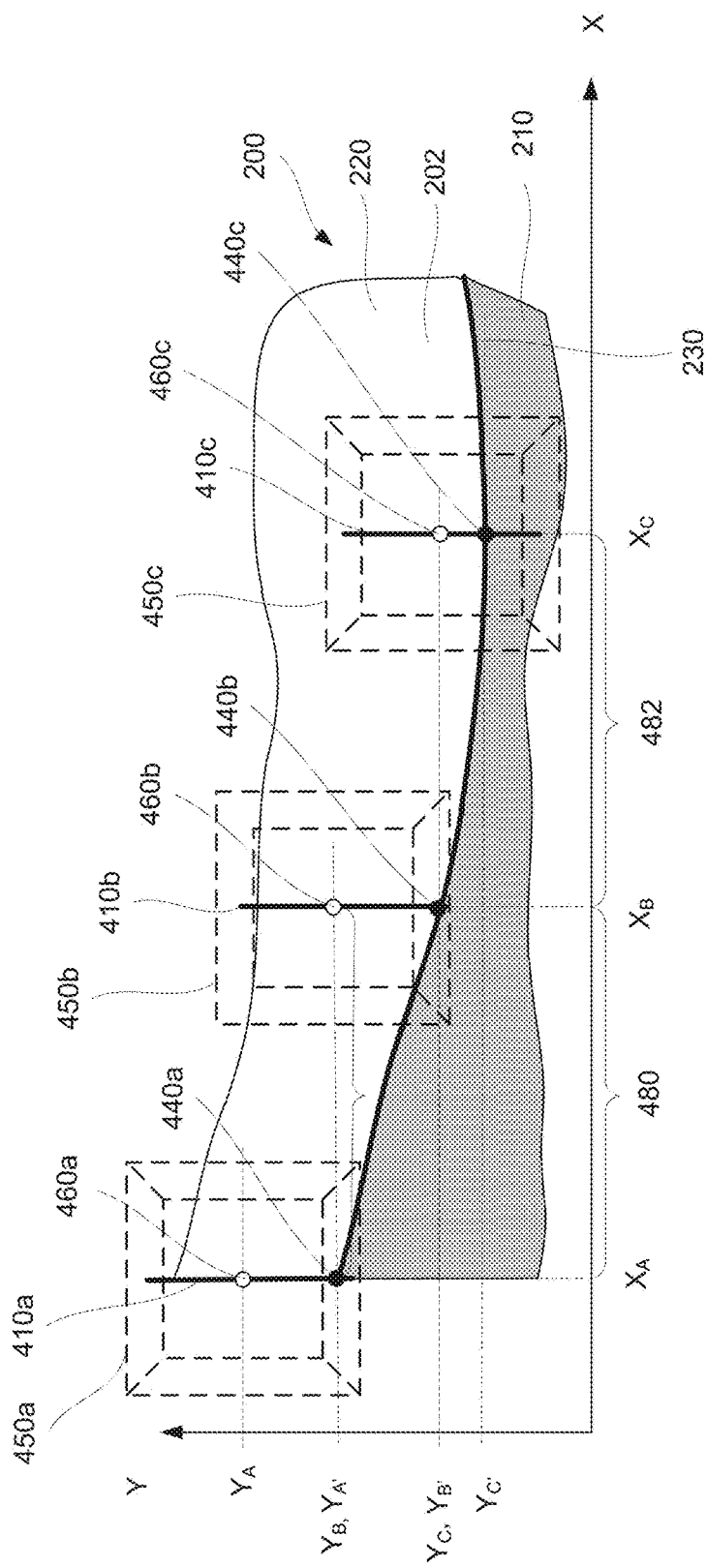

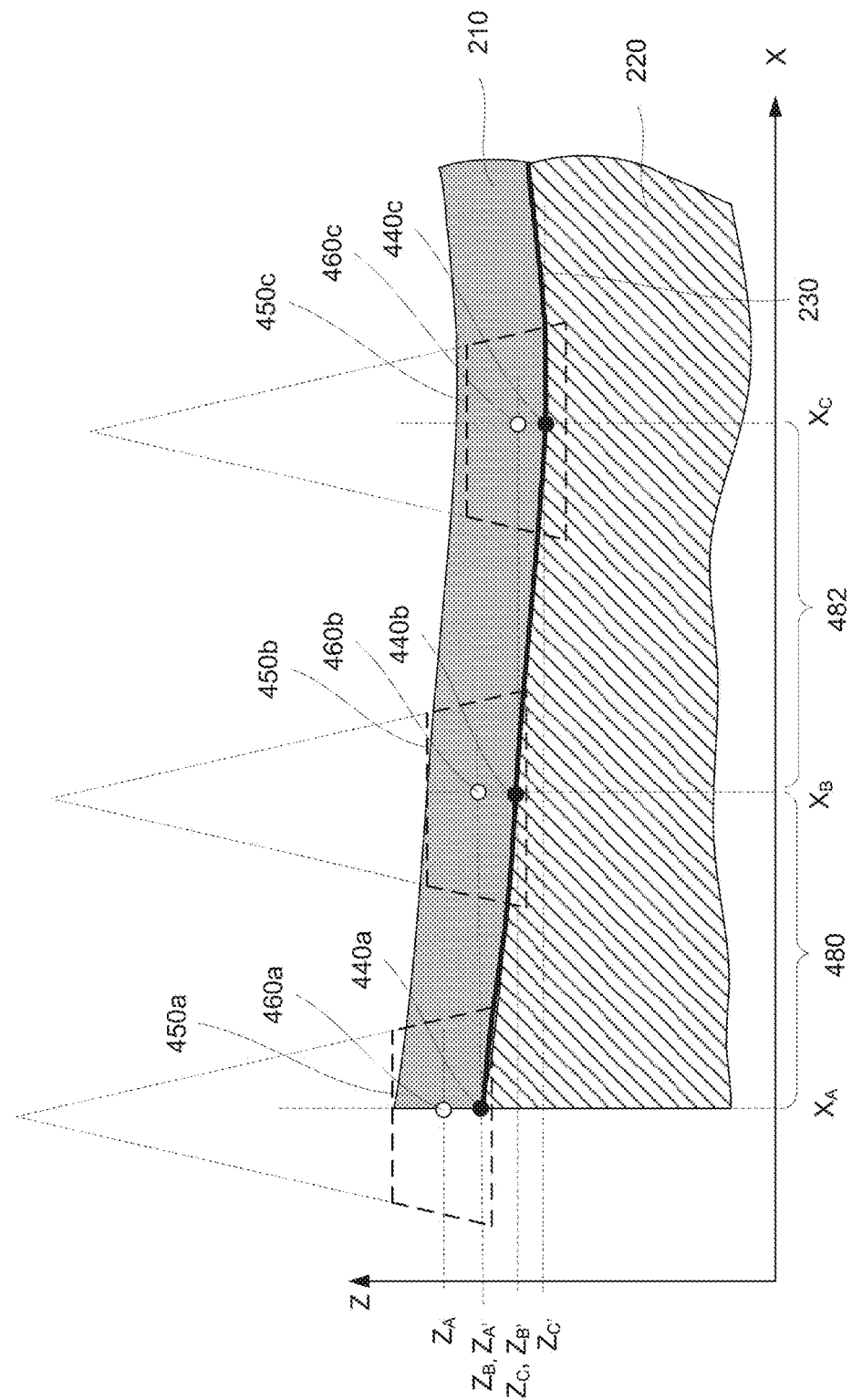

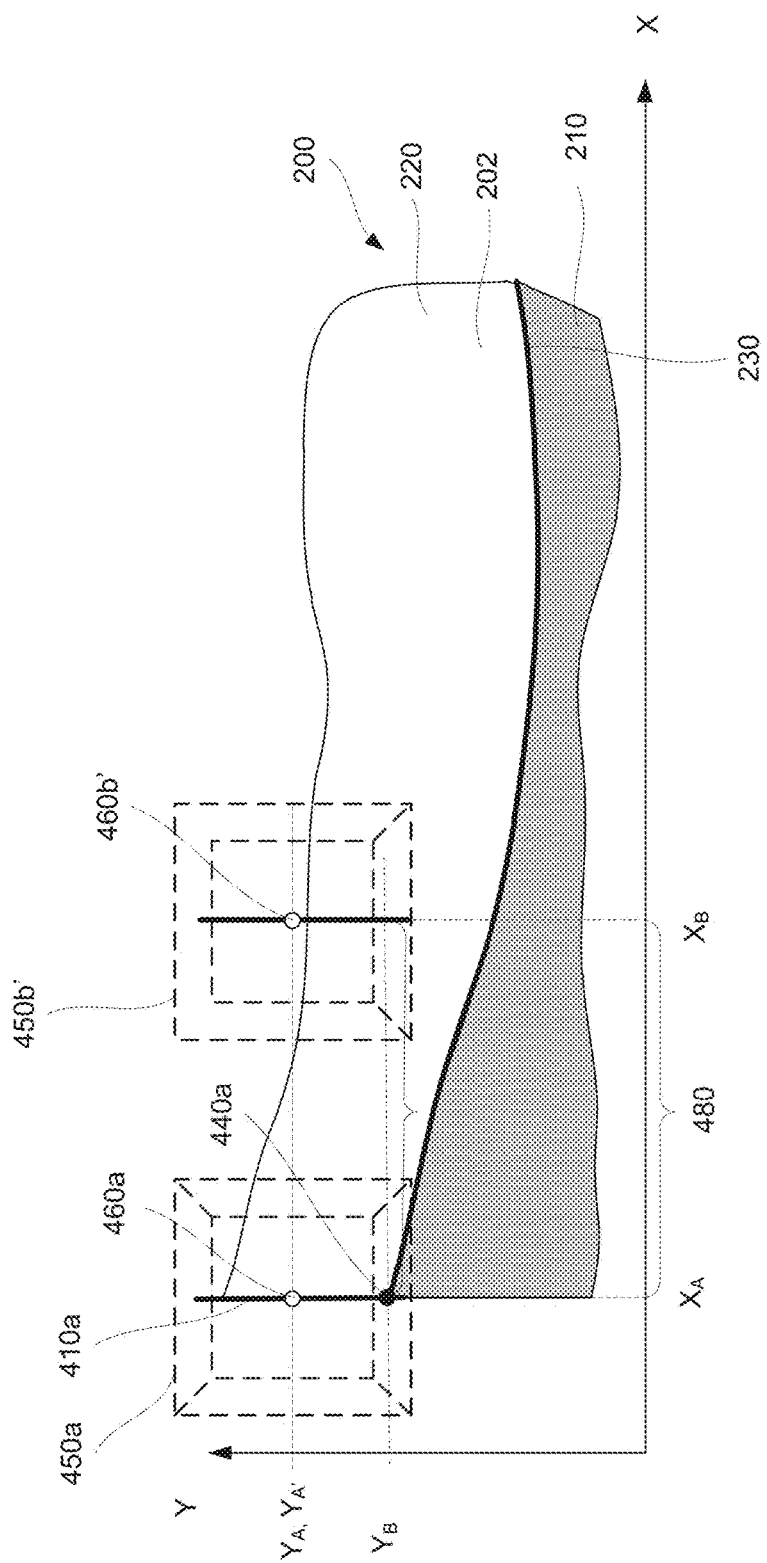

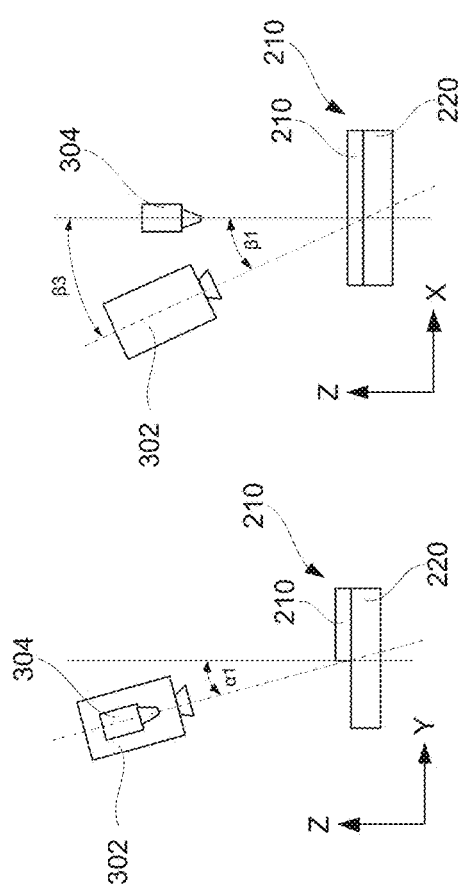
FIG. 5A
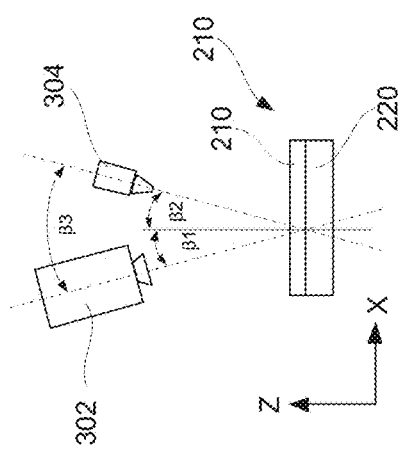
FIG. 5B
FIG. 5C

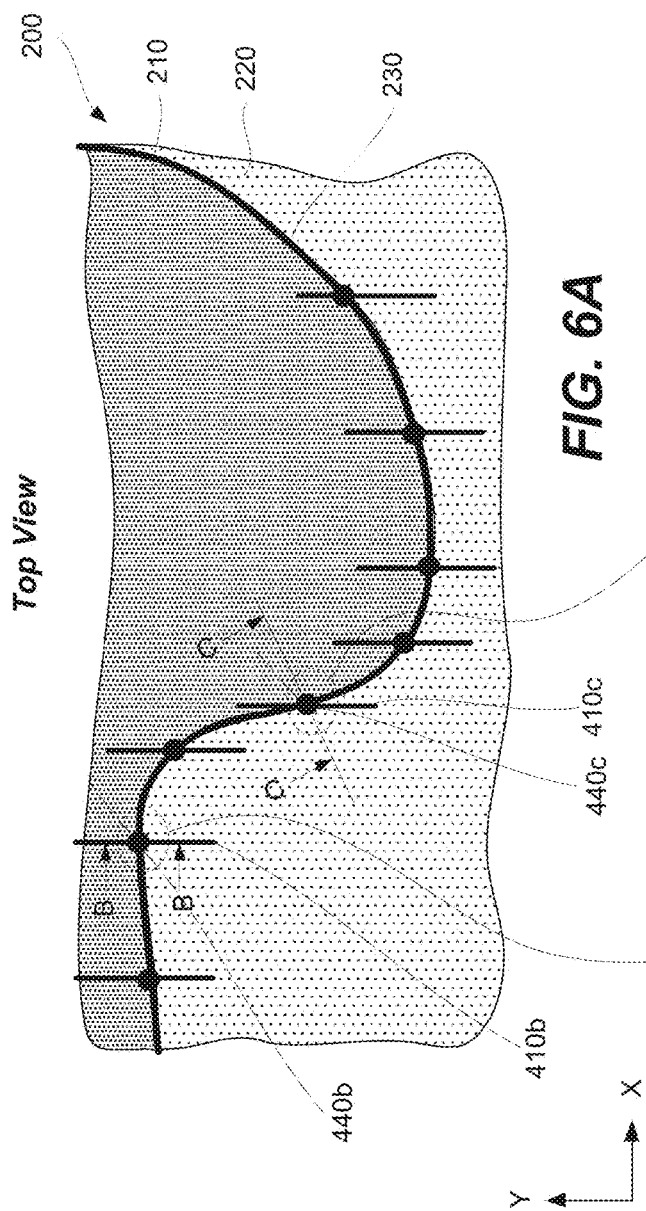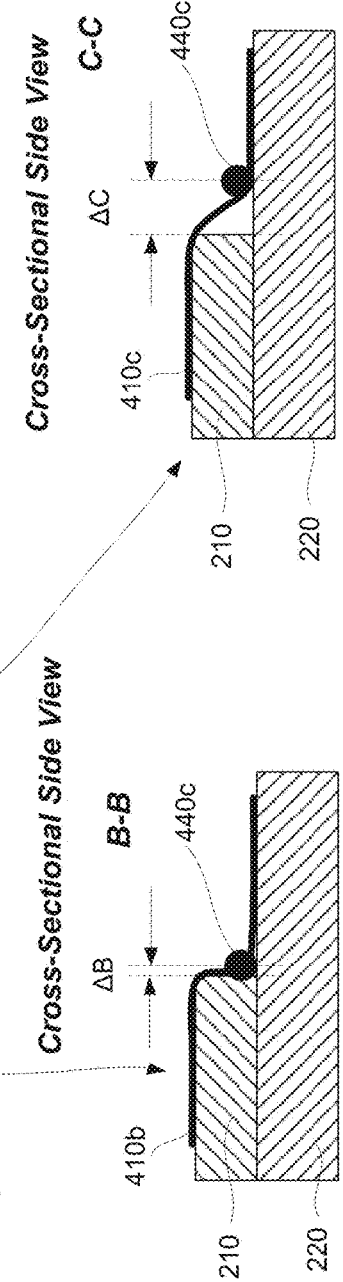

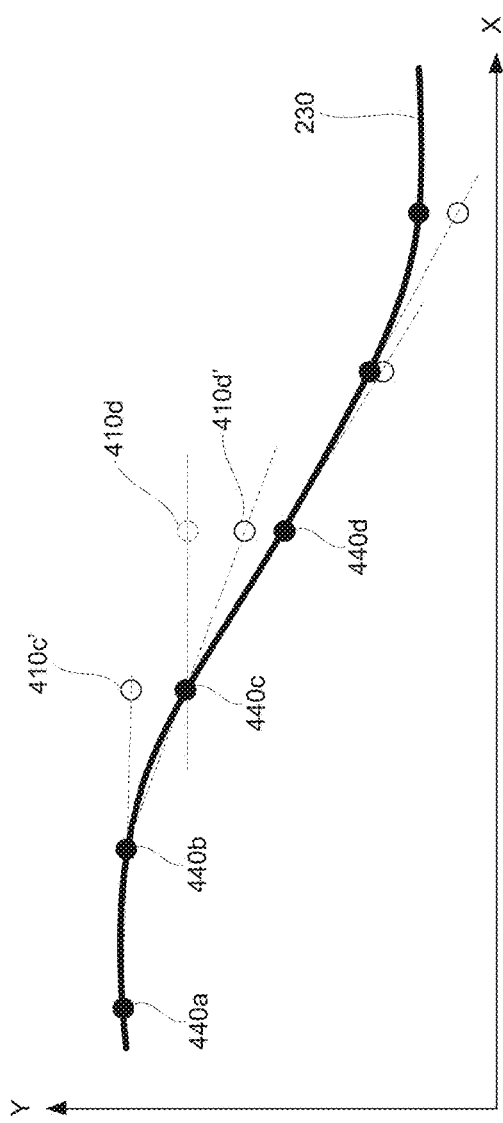
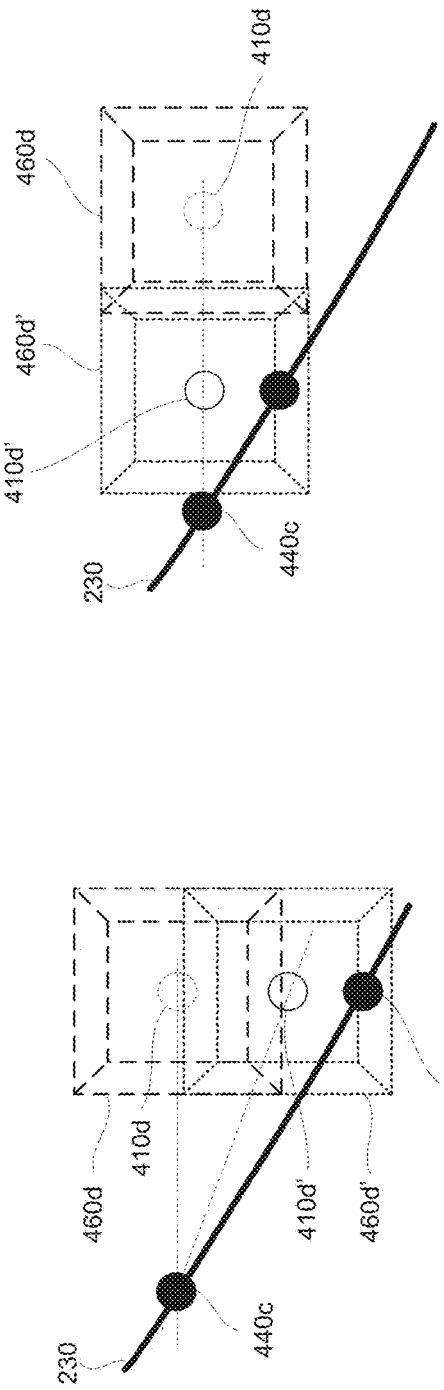
FIG. 8
FIG. 9A
FIG. 9B

SYSTEMS AND METHODS FOR GENERATING PATHS FOR PROCESSING PHYSICAL PROFILES OF PARTS

BACKGROUND

Some parts, such as wings of an aircraft, are flexible and may change shape depending on various factors, such as the loads applied, e.g., as the parts are being supported during fabrication. This flexibility makes precise processing of such parts difficult, in part because a computer-aided design (CAD) model of a flexible part may not be representative of the actual shape of the part, flexed when supported in a particular manner. Accordingly, inspection of such parts may be used to identify the actual shape. However, most conventional inspection techniques are insufficiently accurate and/or are too time-intensive.

SUMMARY

Accordingly, systems and methods, intended to address at least the above-identified concerns, would find utility.

The following is a non-exhaustive list of examples, which may or may not be claimed, of the subject matter according to the present disclosure.

One example of the subject matter according to the present disclosure relates to a method of generating a path for processing a physical profile of a part with a tool. The physical profile has a shape. The method comprises identifying a processing location on the physical profile of the part. The processing location is within an inspection region. The method also comprises identifying an inspection-region location based on the processing location. An inspection region is geometrically associated with the inspection-region location. The method additionally comprises identifying a processing location on the physical profile of the part. The processing location is within the inspection region. The method also comprises generating at least a portion of the path based on the processing location and the processing location.

Another example of the subject matter according to the present disclosure relates to a machine-readable program for causing a machine to generate a path for processing a physical profile of a part by performing operations that comprise identifying a first processing location on the physical profile of the part. The first processing location is within a first inspection region. The operations also comprise identifying a second inspection-region location based on the first processing location. A second inspection region is geometrically associated with the second inspection-region location. The operations additionally comprise identifying a second processing location on the physical profile of the part. The second processing location is within the second inspection region. The operations also comprise generating at least a portion of the path based on the first processing location and the second processing location.

Yet another example of the subject matter according to the present disclosure relates to a computer system for causing a machine to generate a path for processing a physical profile of a part. The computer system comprises a processor programmed to cause the machine to perform operations that comprise identifying a first processing location on the physical profile of the part. The first processing location is within a first inspection region. The operations also comprise identifying a second inspection-region location based on the first processing location. A second inspection region is geometrically associated with the second inspection-region location. The operations also comprise identifying a second processing location on the physical profile of the part. The second processing location is within the second inspection region. The operations additionally comprise generating at least a portion of the path based on the first processing location and the second processing location. The computer system comprises a memory for storing data representing the first processing location, the first inspection-region location, the second processing location, and at least the portion of the path.

BRIEF DESCRIPTION OF THE DRAWINGS

Figure 1:
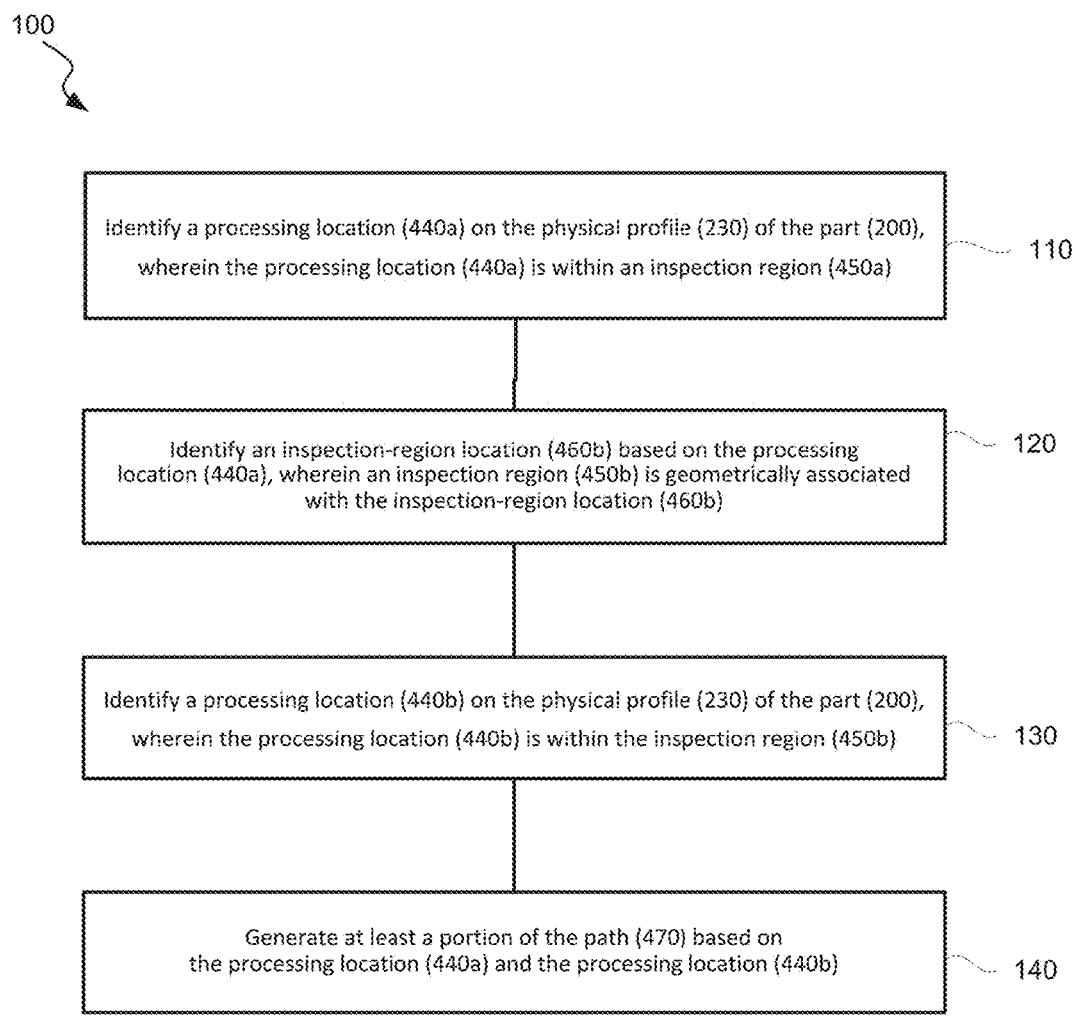
Figure 2:
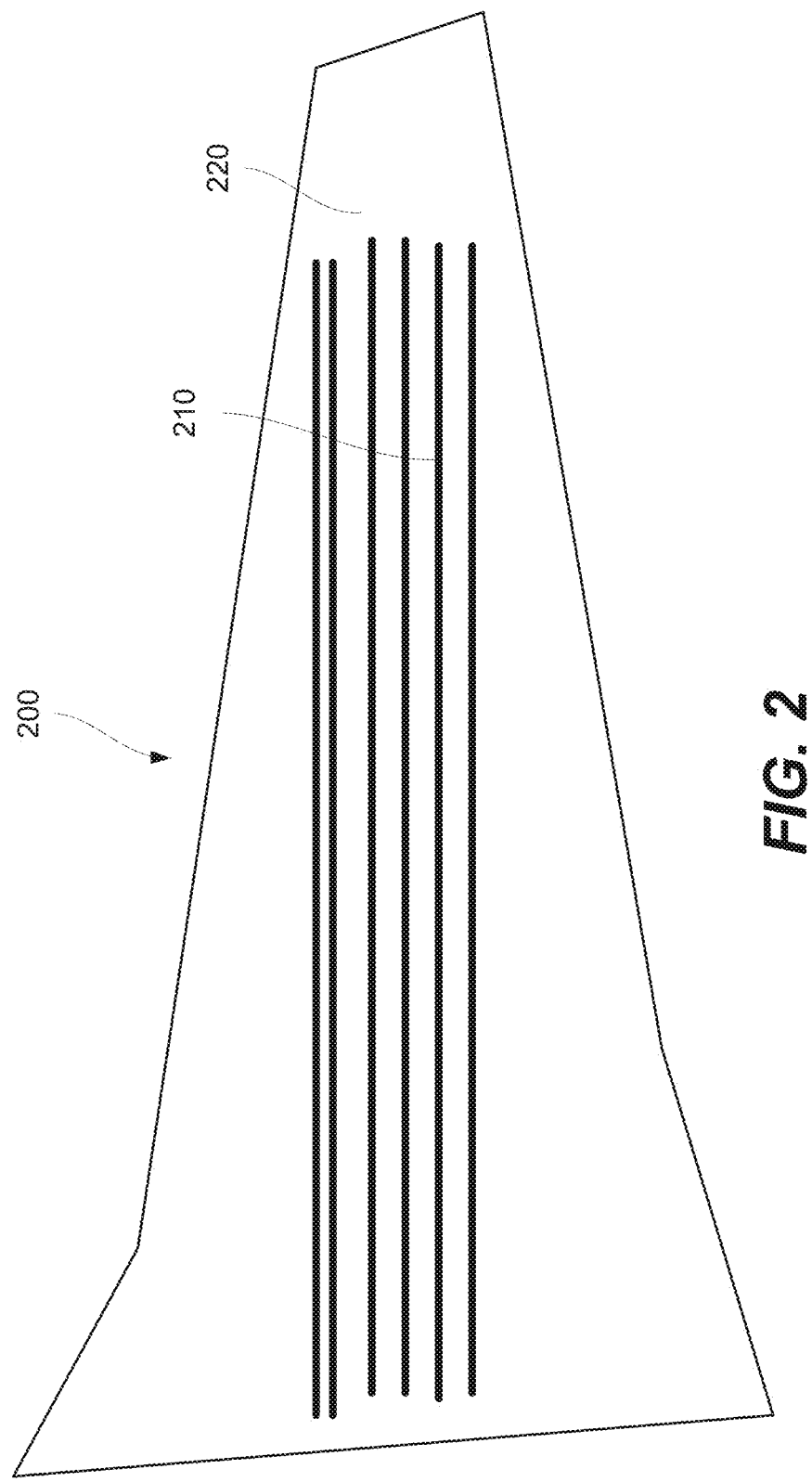
Figure 3A:
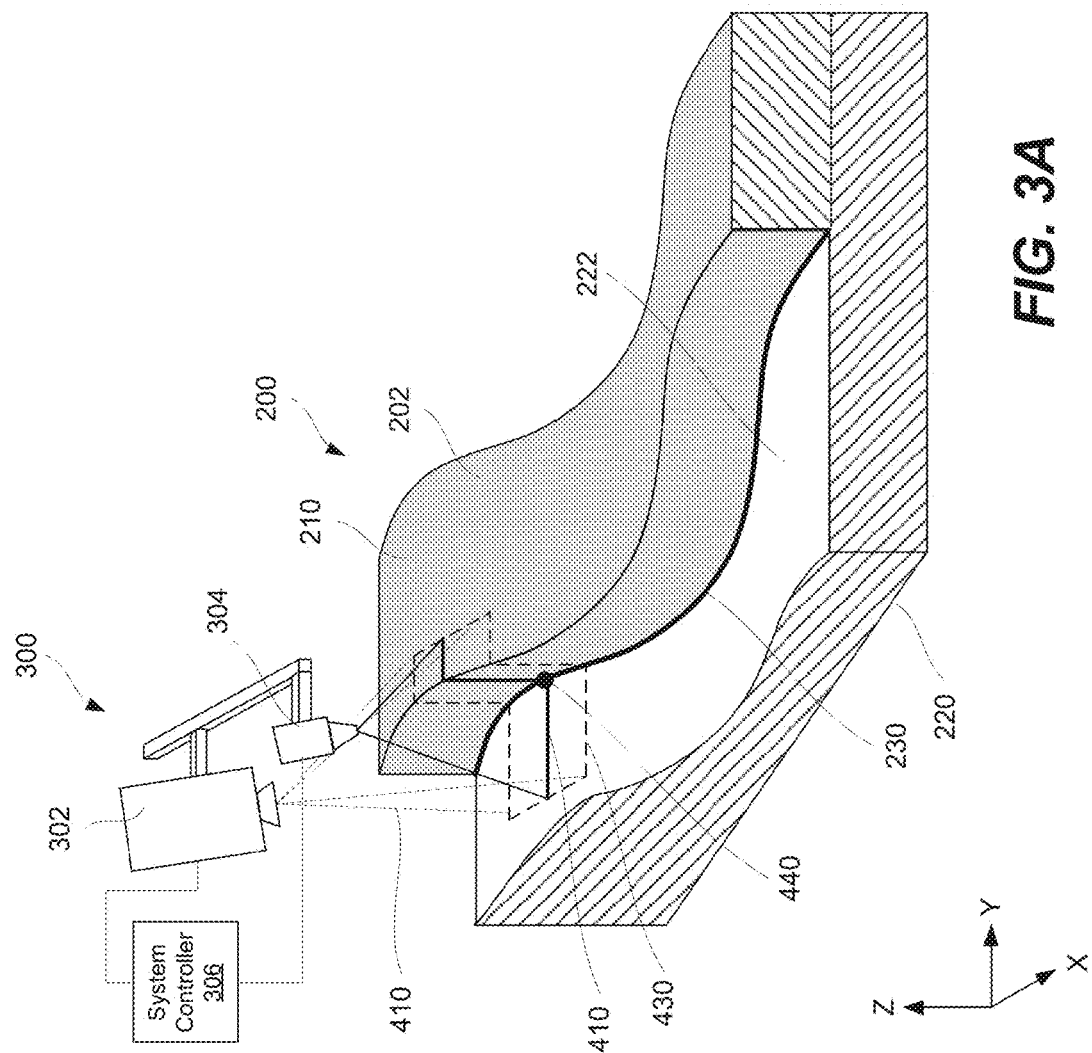
Figure 3C:
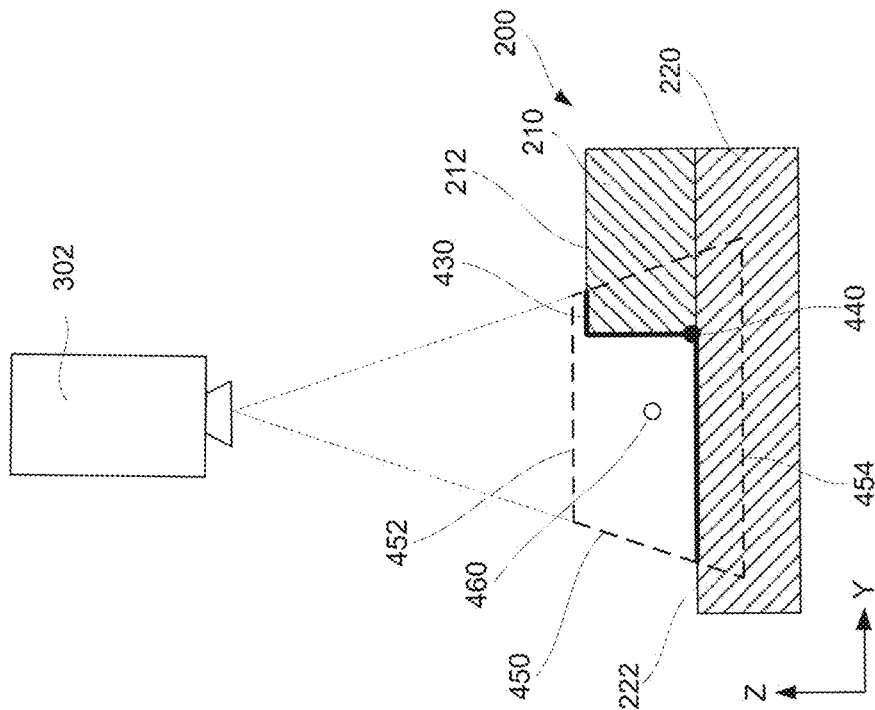
Figure 3B:
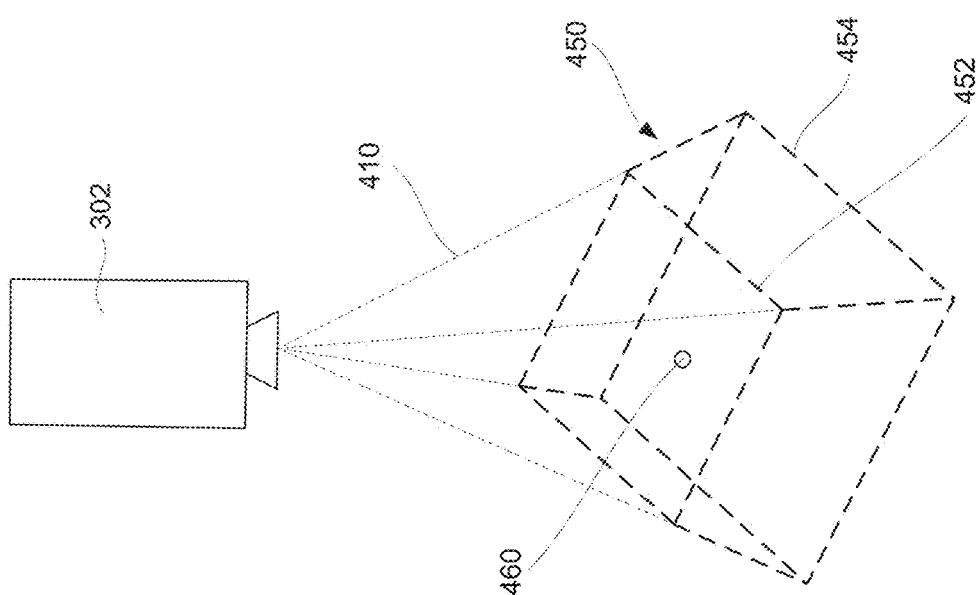
Figure 3D:
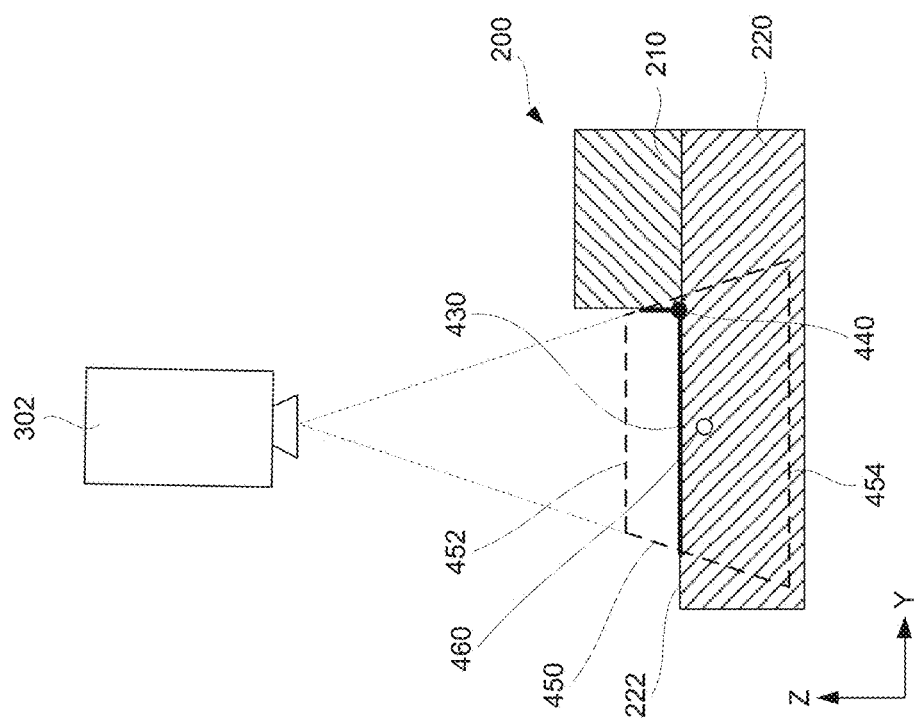
Figure 3G:
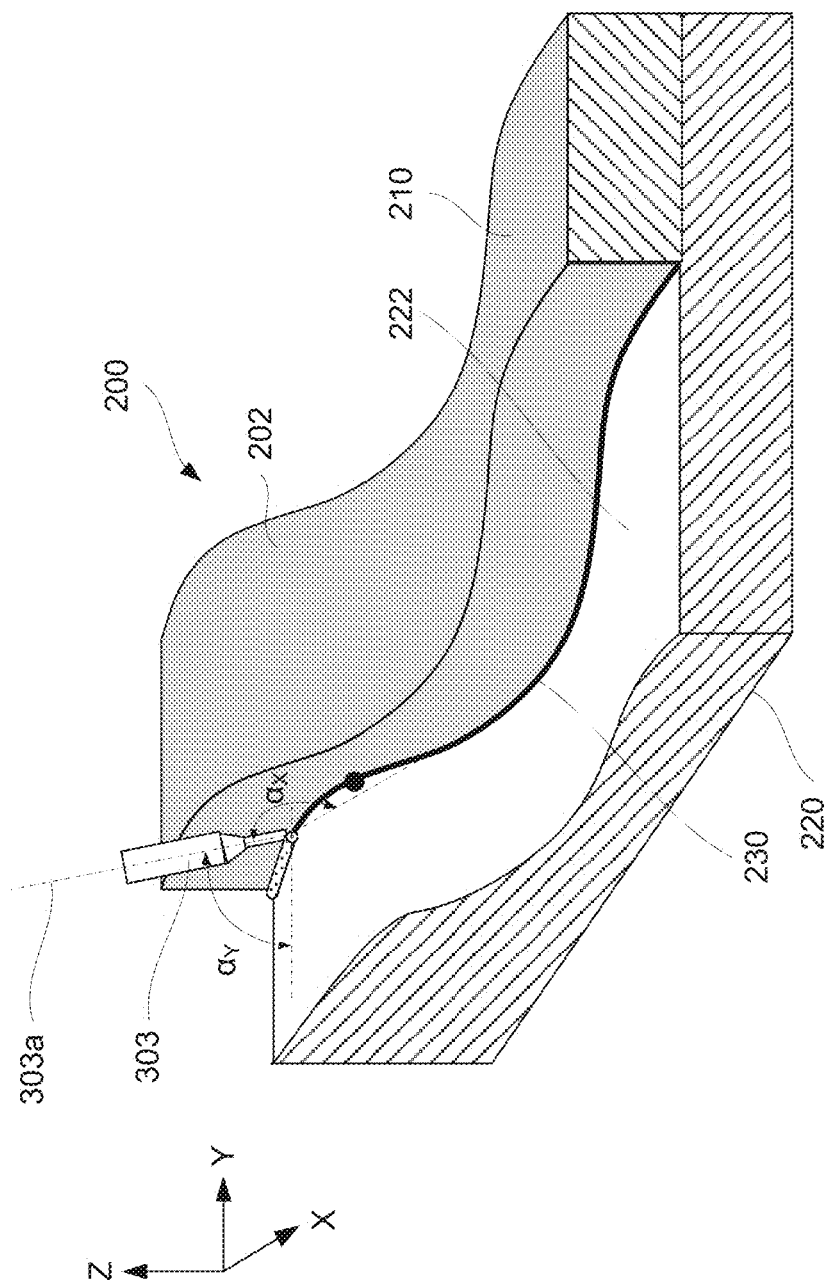
Figure 7A:
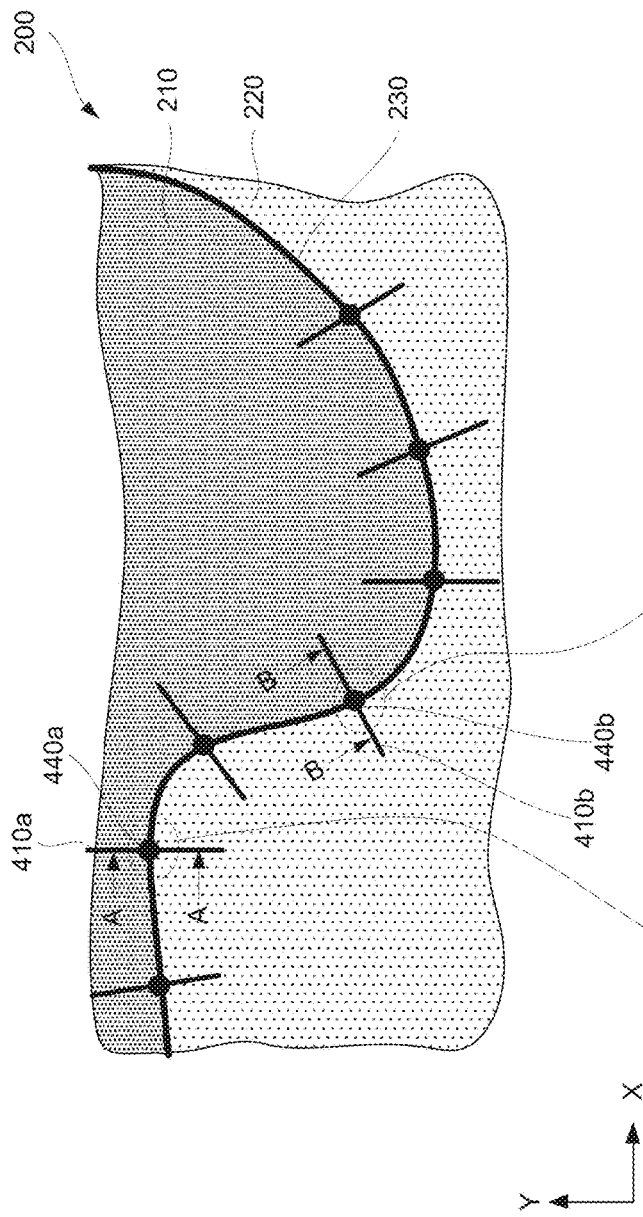
Figure 7C:
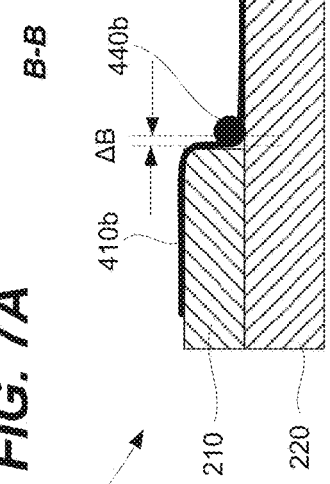
Figure 7B:
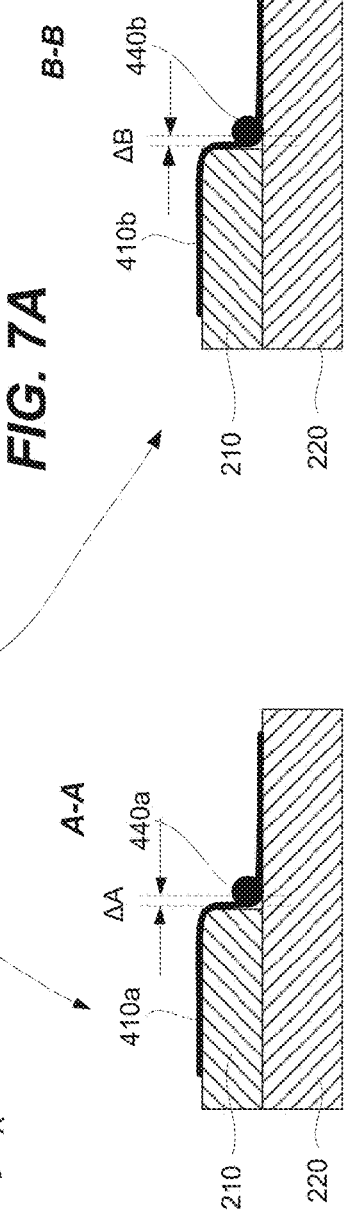
Figure 11A:
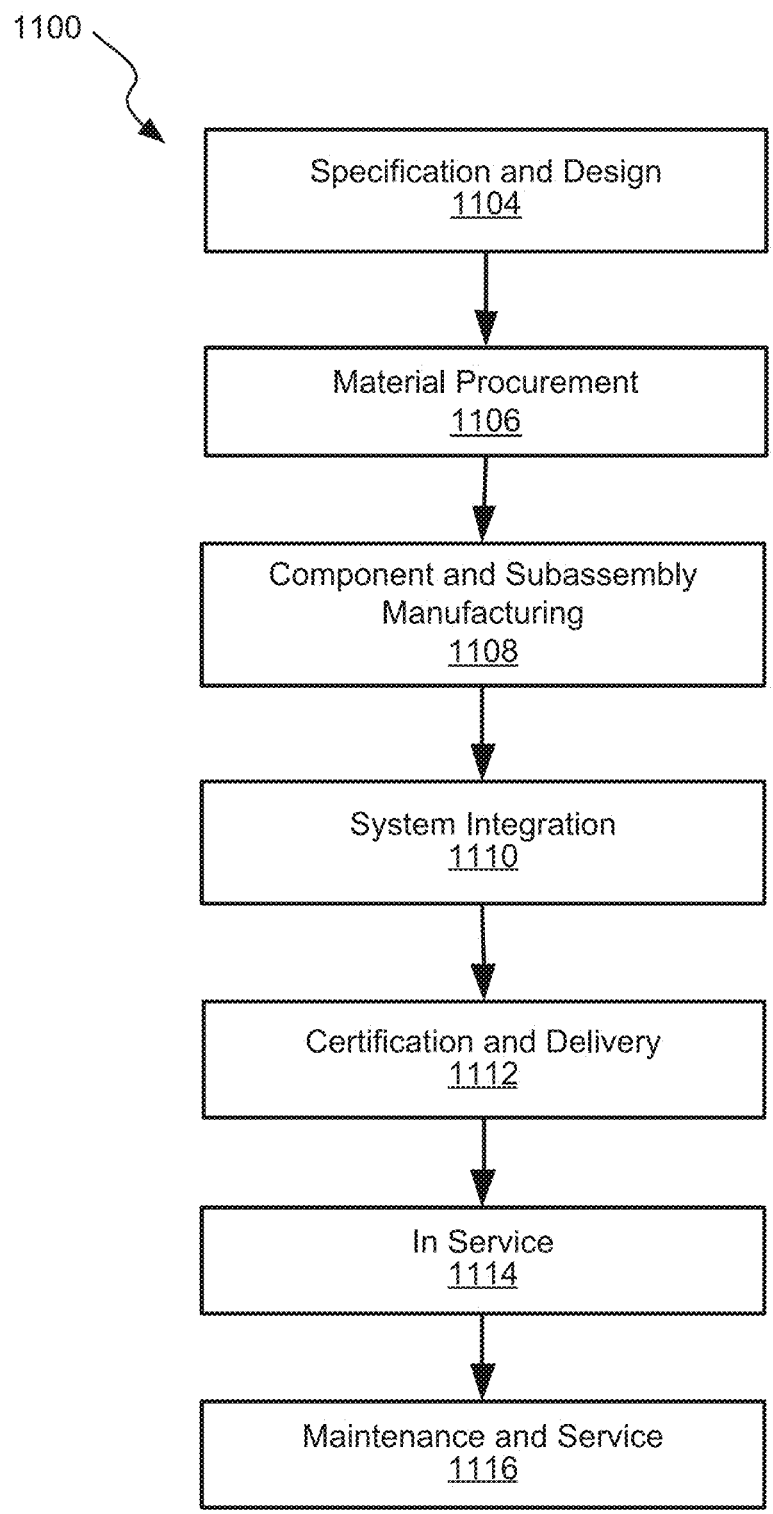
Figure 11B:
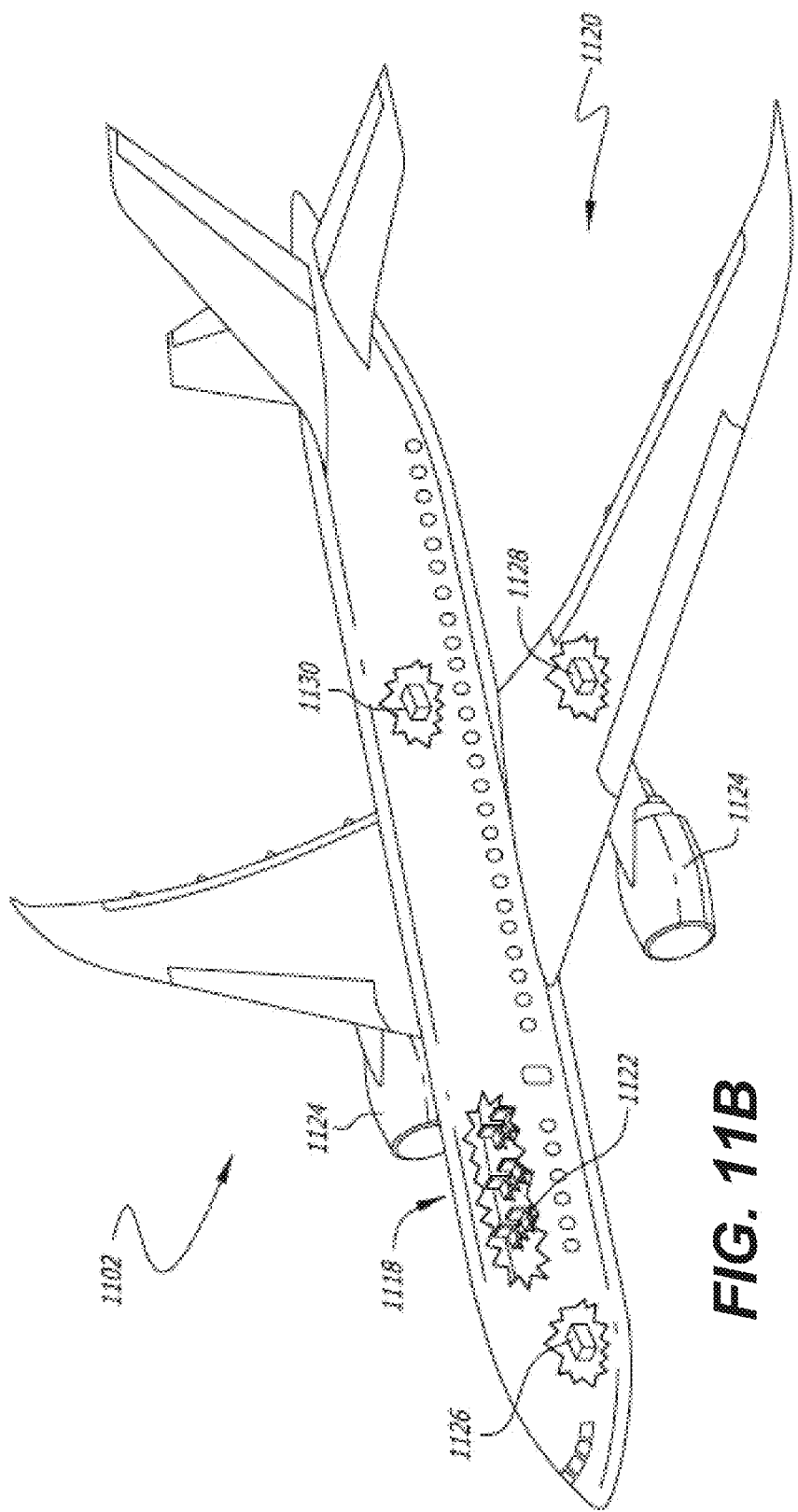

Having thus described examples of the present disclosure in general terms, reference will now be made to the accompanying drawings, which are not necessarily drawn to scale, and wherein like reference characters designate the same or similar parts throughout the several views, and wherein:

FIG. 1 is a block diagram of a method of generating a path for processing a physical profile of a part, according to one or more examples of the present disclosure;

FIG. 2 is a schematic, top view of a part, according to one or more examples of the present disclosure;

FIG. 3A is a schematic, perspective view of a portion of the part of FIG. 2 being inspected using a machine, according to one or more examples of the present disclosure;

FIG. 3B is a schematic, view of a detector of the machine of FIG. 3A and a corresponding field of view determining an inspection region, according to one or more examples of the present disclosure;

FIG. 3C is a schematic, sectional side view of the detector and the corresponding inspection region of FIG. 3B, showing one orientation of the inspection region relative to the part, according to one or more examples of the present disclosure;

FIG. 3D is a schematic, sectional side view of the detector and the corresponding inspection region of FIG. 3B showing a different orientation of the inspection region relative to the part, according to one or more examples of the present disclosure;

FIG. 3E is a schematic, side view of the inspection region of FIG. 3B and its inspection-region location, according to one or more examples of the present disclosure;

FIG. 3F is a schematic, top view of the inspection region of FIG. 3B and its inspection-region location, according to one or more examples of the present disclosure;

FIG. 3G is a schematic, perspective view of the portion of the part of FIG. 2 and FIG. 3A being processed using a tool, according to one or more examples of the present disclosure;

FIG. 4A is a schematic, top view of the part of FIG. 3A, illustrating multiple inspection regions along the physical profile of the part, according to one or more examples of the present disclosure;

FIG. 4B is a schematic, sectional side view of the part of FIG. 3A, illustrating the same multiple inspection regions as in FIG. 4A along the physical profile of the part, according to one or more examples of the present disclosure;

FIG. 4C is a schematic, top view of the part of FIG. 3A, illustrating two inspection regions along the physical profile of the part, according to one or more examples of the present disclosure;

FIG. 5A is a schematic, side view of a detector and an emitter of the machine illustrated in FIG. 3A, showing relative orientation of the detector and the emitter and orientation of the detector and the emitter relative to the part, according to one or more examples of the present disclosure;

FIG. 5B is a schematic, side view of a detector and an emitter of the machine illustrated in FIG. 3A, showing relative orientation of the detector and the emitter and orientation of the detector and the emitter relative to the part, according to one or more examples of the present disclosure;

FIG. 5C is a schematic, side view of a detector and an emitter of the machine illustrated in FIG. 3A, showing relative orientation of the detector and the emitter and orientation of the detector and emitter relative to the part, according to one or more examples of the present disclosure;

FIG. 6A is a schematic, top view of the part of FIG. 3A, illustrating multiple indicators along the physical profile of the part, according to one or more examples of the present disclosure;

FIG. 6B is a schematic, sectional side view of the part at a location of one of the indicators illustrated in FIG. 6A, according to one or more examples of the present disclosure;

FIG. 6C is a schematic, sectional side view of the part at a location of another one of the indicators illustrated in FIG. 6A, according to one or more examples of the present disclosure;

FIG. 7A is a schematic, top view of the part of FIG. 3A, illustrating multiple indicators along the physical profile of the part having different locations and/or orientations than the indicators shown in FIG. 6A, according to one or more examples of the present disclosure;

FIG. 7B is a schematic, sectional side view of the part at a location of one of the indicators illustrated in FIG. 7A, according to one or more examples of the present disclosure;

FIG. 7C is a schematic, cross-sectional side view of the part at a location of another one of the indicators illustrated in FIG. 7A, according to one or more examples of the present disclosure;

FIG. 8 is a schematic view of different processing locations and inspection-region locations relative to the physical profile, according to one or more examples of the present disclosure;

FIG. 9A is a schematic view illustrating the effect of determining a new inspection-region location based on a trend line established using previous processing locations, according to one or more examples of the present disclosure;

FIG. 9B is a schematic view illustrating the effect of determining the distance of between the inspection-region location and previous processing location, according to one or more examples of the present disclosure;

FIGS. 10A-10D are schematic views of processing locations and corresponding paths generated based on these processing locations, according to one or more examples of the present disclosure;

FIG. 11A is a block diagram of aircraft production and service methodology;

FIG. 11B is a schematic illustration of an aircraft; and

Figure 12:
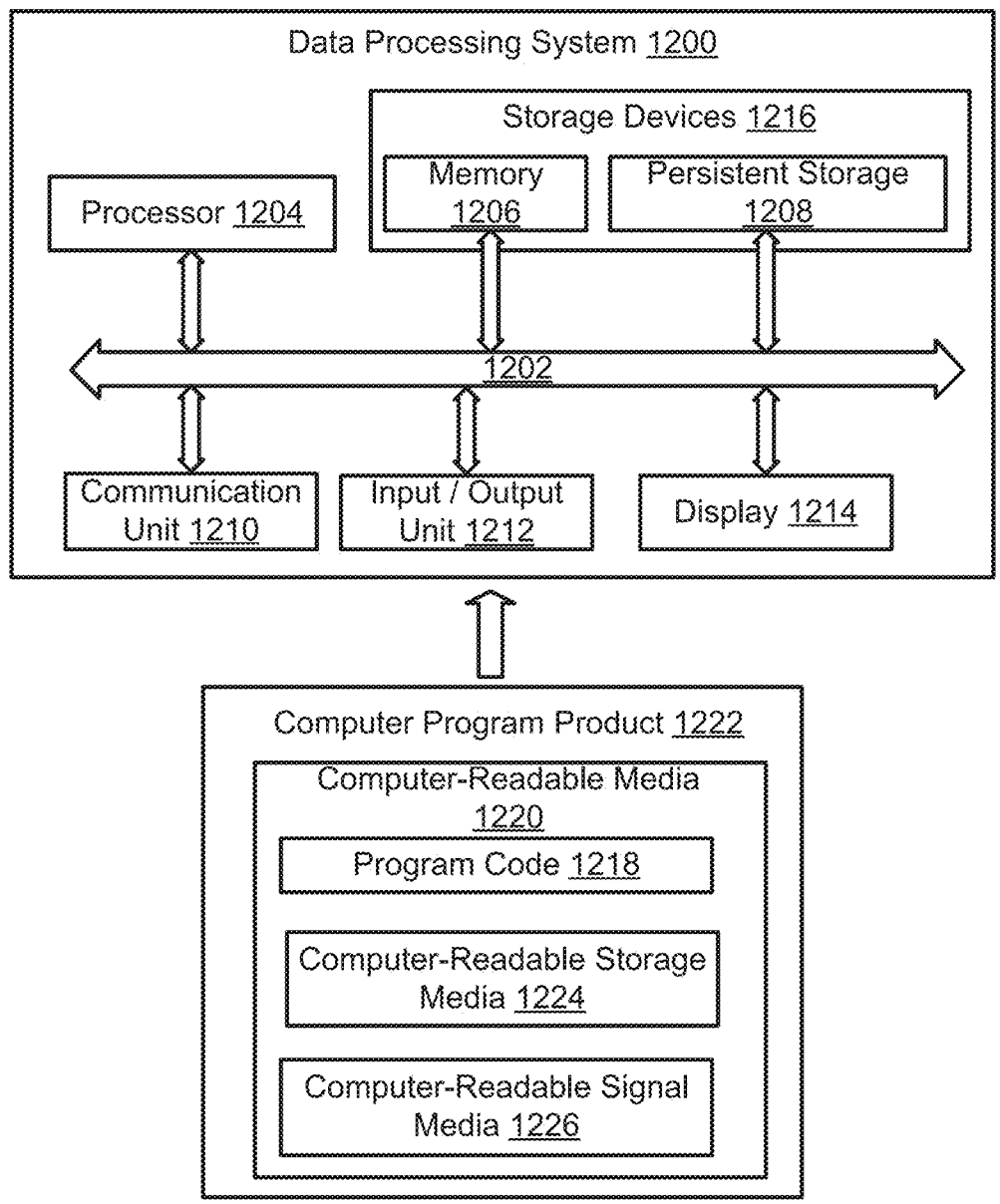

FIG. 12 is a block diagram of a computer system, according to one or more examples of the present disclosure.

DETAILED DESCRIPTION

In FIGS. 11A-11B, referred to above, the blocks may represent operations and/or portions thereof and lines connecting the various blocks do not imply any particular order or dependency of the operations or portions thereof. Blocks represented by dashed lines indicate alternative operations and/or portions thereof. Dashed lines, if any, connecting the various blocks represent alternative dependencies of the operations or portions thereof. It will be understood that not all dependencies among the various disclosed operations are necessarily represented. FIGS. 11A-11B and the accompanying disclosure describing the operations of the method(s) set forth herein should not be interpreted as necessarily determining a sequence in which the operations are to be performed. Rather, although one illustrative order is indicated, it is to be understood that the sequence of the operations may be modified when appropriate. Accordingly, certain operations may be performed in a different order or simultaneously. Additionally, those skilled in the art will appreciate that not all operations described need be performed.

In the following description, numerous specific details are set forth to provide a thorough understanding of the disclosed concepts, which may be practiced without some or all of these particulars. In other instances, details of known devices and/or processes have been omitted to avoid unnecessarily obscuring the disclosure. While some concepts will be described in conjunction with specific examples, it will be understood that these examples are not intended to be limiting.

Unless otherwise indicated, the terms "first," "second," etc. are used herein merely as labels, and are not intended to impose ordinal, positional, or hierarchical requirements on the items to which these terms refer. Moreover, reference to, e.g., a "second" item does not require or preclude the existence of, e.g., a "first" or lower-numbered item, and/or, e.g., a "third" or higher-numbered item.

Reference herein to "one example" means that one or more feature, structure, or characteristic described in connection with the example is included in at least one implementation. The phrase "one example" in various places in the specification may or may not be referring to the same example.

Illustrative, non-exhaustive examples, which may or may not be claimed, of the subject matter according the present disclosure are provided below.

Referring generally to FIG. 1 and particularly to, e.g., FIGS. 3A, 3C, 3D, 4A, 4B, and 10A-10D, method 100 of generating path 470 for processing physical profile 230 of part 200 with tool 303 is provided. Physical profile 230 has a shape. Method 100 comprises identifying processing location 440a on physical profile 230 of part 200. Processing location 440a is within inspection region 450a. Method 100 also comprises identifying inspection-region location 460b based on processing location 440a. Inspection region 450b is geometrically associated with inspection-region location 460b. Method 100 additionally comprises identifying processing location 440b on physical profile 230 of part 200. Processing location 440b is within inspection region 450b. Method 100 also comprises generating at least a portion of path 470 based on processing location 440a and processing location 440b. The preceding subject matter of this paragraph characterizes example 1 of the present disclosure.

Identifying inspection-region location 460b based on processing location 440a provides more precision in inspection region 450b being close to physical profile 230 and being able to identify processing location 440b, which is a next processing location. Furthermore, this aspect allows using smaller fields of view resulting in smaller inspection region 450b thereby increasing precision with which processing location 440b is identified. Processing location 440a is obtained during a previous inspection and accurately represent physical profile 230, which may change due to, for example, flexibility of part 200. Without this correspondence between inspection-region location 460b and processing location 440a, inspection region 450b may not overlap with physical profile 230 when, for example, physical profile 230 has major deviations.

FIG. 4A illustrates one example of inspection-region location 460b being based on processing location 440a. Specifically, inspection-region location 460b adapts the Y-coordinate of processing location 440a ($Y_B = Y_{A'}$) in this particular example. It should be noted that in this example, the Y-coordinate of inspection-region location 460b is selected based on the location of physical profile 230 (represented by processing location 440a) rather than based on the Y-coordinate of previous inspection-region location 460a ($Y_A \neq Y_{A'}$). Now referring to an example shown in FIG. 4C, if inspection-region location 460b' is not based on processing location 440a and, instead, the Y-coordinate adjustment from inspection-region location 460a (previous inspection location) is carried to inspection-region location 460b' (new inspection location) is not performed (in which case $Y_A = Y_{A'}$), inspection region 450b' may not overlap with physical profile 230 and physical profile 230 will not be detected when inspection region 450b' is used. FIG. 4B illustrates another example of inspection-region location 460b being based on processing location 440a, which may be combined with the example presented in FIG. 4A. Furthermore, various trending functions described below with reference to FIGS. 8 and 9A may be used as described below.

Method 100 may be performed by using machine 300 for inspection of part 200. One example of machine 300 is shown in FIG. 3A. In this example, machine 300 is shown to include system controller 306. In some examples, all or some operations of method 100 are performed using system controller 306. Furthermore, all or some operations of method 100 may be performed using a standalone computer system, such as computer system 1200 shown in FIG. 12. Computer system 1200 may be a separate and independent from machine 300. Alternatively, machine 300 or computer system 1200 performing some or all operations of method 100 may be integrated into tool 303, one example of which is shown in FIG. 3G. Tool 303 may be used to process part 200 or, more specifically, to process physical profile 230 of part 200 based on generated path 470.

Method 100 comprises identifying processing location 440a on physical profile 230 of part 200 as, for example, shown in FIGS. 4A and 4B. Processing location 440a is within inspection region 450a. Specifically, processing location 440a may be a point on physical profile 230 intersecting a particular feature of inspection region 450a, such as indicator 410a. As such, physical profile 230 also passes through inspection region 450a in order for processing location 440a to be identified. Identifying processing location 440a may be performed using an optical inspection of the surface of part 200 within inspection region 450a and, more specifically, at the intersection with indicator 410a.

Inspection region 450b is geometrically associated with inspection-region location 460b. For example, inspection-region location 460b may be in the center of inspection region 450b. While inspection-region location 460b needs to be as close as possible to physical profile 230 (which is achieved by basing inspection-region location 460b on processing location 440a), inspection-region location 460b may not have other specific relationship to part 200. For example, FIGS. 3C and 3D illustrate that inspection-region location 460 does not need to be positioned on any surfaces of part 200. In FIG. 3C, inspection-region location 460 is positioned above main surface 222 of second component 220, while in FIG. 3D, inspection-region location 460 is positioned below main surface 222 of second component 220. In both cases, inspection region 450 overlaps with physical profile 230 so that processing location 440 can be identified.

Method 100 comprises identifying processing location 440b on physical profile 230 of part 200. This operation may be, in some aspects, similar to identifying processing location 440a described above. For example, optical inspection may be used for these purposes. As noted above, processing location 440b is within inspection region 450b.

Method 100 also comprises generating at least a portion of path 470 based on processing location 440a and processing location 440b. Path 470 is a representation of physical profile 230 and may be used to process part 200, such as applying adhesive along path 470. As such, path 470 may need to be within a set tolerance from physical profile 230. Processing location 440a and processing location 440b are used as representations of physical profile 230 used for generating path 470. In some aspects, processing location 440a and processing location 440b may be used alone to generating entire path 470, which may be linear or have some other shape (e.g., shape identified from the pre-existing data where processing location 440a and processing location 440b are used for resizing the shape and orientating the shape in space). Alternatively, processing location 440a, processing location 440b, and additional processing locations may be used to generate path 470. Some examples of path generation are shown in FIGS. 10A-10D and described below.

Referring generally to FIG. 2 and particularly to, e.g., FIGS. 3A, 3B, 3E and 3F, inspection region 450a is geometrically associated with inspection-region location 460a, which is identified based on pre-existing data related to the shape of physical profile 230 of part 200. The preceding subject matter of this paragraph characterizes example 2 of the present disclosure, wherein example 2 also includes the subject matter according to example 1, above.

Each inspection region may be geometrically associated with a corresponding inspection-region location. Some of these inspection-region location may be identified based on processing locations as described above. Other inspection-region location may be identified on other parameters, such as pre-existing data related to the shape of physical profile 230 of part 200. For example, inspection region 450a may the first inspection region without any previous processing locations identified. In this case, inspection-region location 460a of inspection region 450a cannot be identified based in a processing location and other information is needed to identify inspection-region location 460a of inspection region 450a. This information may be extracted from pre-existing data.

In some aspects, inspection-region location 460a may be a three dimensional coordinate of a point as a well as three rotational angles of inspection region 450a relative to a fixed coordinate system. Alternatively, inspection-region location 460a may be three dimensional coordinates of two points and one rotational angle. In yet another example, inspection-region location 460a may three dimensional coordinates of three points not positioned on the same line. For example, one point may be positioned in the center of inspection region 450a. In some aspects, one or more points may be positioned at edges or corners of inspection region 450a.

Pre-existing data related to the shape of physical profile 230 of part 200 may be based on a preliminary inspection, for example, using machine 300 (e.g., lower accuracy inspection) or a different machine (e.g., an edge finder). Furthermore, the data may be empirically obtained from previous inspection of other parts, various aspects of the part support/featuring, manual data entry, and the like.

Referring generally to FIG. 3A and particularly to, e.g., FIGS. 3B-3F and 4A-4B, identifying processing location 440a on physical profile 230 of part 200 comprises detecting processing location 440a within inspection region 450a. The preceding subject matter of this paragraph characterizes example 3 of the present disclosure, wherein example 3 also includes the subject matter according to any one of examples 1 or 2, above.

Processing location 440a is positioned within inspection region 450a in order for detection to occur. Areas outside of inspection region 450a are not inspecting. As such, processing location 440a cannot be detected outside of inspection region 450a. In general, processing location 440a may be anywhere within inspection region 450a accessible for inspection, e.g., not shielded from machine 300 used for inspection. One exemplary detection technique may be optical inspection, which is described further below with reference to FIG. 3A.

Referring generally to FIG. 3A and particularly to, e.g., FIGS. 3B-3F and 5A-5C, processing location 440a on physical profile 230 of part 200 is detected within inspection region 450a using machine 300, comprising detector 302 and emitter 304. The preceding subject matter of this paragraph characterizes example 4 of the present disclosure, wherein example 4 also includes the subject matter according to example 3, above.

Processing location 440a is positioned within inspection region 450a in order for detection to occur and be accessible to machine 300. Machine 300 is capable of inspecting inspection region 450a. In fact, inspection region 450a may be defined by machine 300.

FIG. 3B illustrates detector 302 of machine 300. Detector 302 has field of view 415, which is shown as a square pyramid. Inspection region 450 may represent a portion of this pyramid, such as a portion extending a set distance above and below a focal plane of detector 302. In other words, inspection region 450 may represent inspection capabilities of detector 302. Orientation of detector 302 in spaces determines inspection-region location 460.

Detector 302 may be any suitable detector capable of distinguishing physical profile 230 from other areas of part 200. Some examples of detector 302 include, but are not limited, to a vision camera, a laser interferometer (measuring the time it takes for a laser to travel back to the sensor), and the like.

Emitter 304 may be any suitable emitter capable of, for example, illuminating a portion of inspection region 450a. For example, emitter 304 may be a laser providing a planar illuminating beam. In other words, the illuminating beam of emitter 304 may be a portion of a plane (e.g., a triangle extending from emitter 304 and to the surface of the part). The intersection of the illuminating beam of emitter 304 and the illuminated surface of part 200 may be referred to as an indicator. It should be noted that an indicator may not cover the entire surface portion within inspection region 450.

Referring generally to FIG. 3A and particularly to, e.g., FIGS. 3C-3D and 4A-4B, to identify processing location 440a on physical profile 230 of part 200, emitter 304 generates indicator 410a that extends through inspection region 450a and across physical profile 230. The preceding subject matter of this paragraph characterizes example 5 of the present disclosure, wherein example 5 also includes the subject matter according to example 4, above.

Indicator 410a identifies processing location 440a on physical profile 230. A portion of physical profile 230 extending through inspection region 450a may be substantial as, for example, shown in FIGS. 4A and 4B. At the same time, detector 302 may not be capable to capture all aspects of this portion. Selecting a single point on this portion may be sufficient. Processing location 440a may represent a point on this portion of physical profile 230.

In some aspects, processing location 440a is an intersection of indicator 410a and physical profile 230. While other portions of physical profile 230 may be within inspection region 450b, these portions may be ignored at, least while identifying processing location 440a on physical profile 230 of part 200. Focusing on the intersection of indicator 410a and physical profile 230 may increase precision of processing location 440a and avoid optical interference, shading, and other issues commonly associated with optical inspections.

Indicator 410 may be defined as a portion of the projection of emitter 304 extending through inspection region 450. If other portions of the projection extend beyond inspection region 450, these portions are ignored for purposes of indicator 410. Because indicator 410 is a projection onto the surface, indicator 410 takes the shape of that surface. FIGS. 3C and 3D illustrate two examples of indicator 410 corresponding to different inspection-region locations 460 relative to part 200. In FIG. 3C, indicator 410 extend on main surface 212 and side surface 214 of first component 210 and main surface 222 of second component. In FIG. 3D, indicator 410 extend on side surface 214 of first component 210 and main surface 222 of second component. In both examples, indicator 410 overlaps with physical profile 230.

Referring generally to FIG. 3A and particularly to, e.g., FIGS. 3B-3F and 4A-4B, identifying processing location 440b on physical profile 230 of part 200 comprises detecting processing location 440b within inspection region 450b. The preceding subject matter of this paragraph characterizes example 6 of the present disclosure, wherein example 6 also includes the subject matter according to any one of examples 4 or 5, above.

Processing location 440b is positioned within inspection region 450b in order for detection to occur. Areas outside of inspection region 450b are not inspecting. As such, processing location 440b cannot be detected outside of inspection region 450b. In general, processing location 440b may be anywhere within inspection region 450b accessible for inspection, e.g., not shielded from machine 300 used for inspection. One exemplary detection technique may be optical inspection, which is described further below with reference to FIG. 3A.

Referring generally to FIG. 3A and particularly to, e.g., FIGS. 3B-3F and 5A-5C, processing location 440b on physical profile 230 of part 200 is detected within inspection region 450b using machine 300. The preceding subject matter of this paragraph characterizes example 7 of the present disclosure, wherein example 7 also includes the subject matter according to example 6, above.

Processing location 440a is positioned within inspection region 450a in order for detection to occur and be accessible to machine 300. Machine 300 is capable of inspecting inspection region 450a. In fact, inspection region 450a may be defined by machine 300. Machine 300 may be used for detecting processing location 440b and, in some aspects, any other processing locations. Machine 300 performs inspection of inspection region 450b and detects at least a part of physical profile 230 of part, e.g., an intersection of physical profile 230 and indicator 410b.

Machine 300 may be an optical inspection machine. In some aspects, machine 300 is movable such that it can target different inspection regions along physical profile. For example, machine 300 may include a robotic arm that has six degrees of freedom.

FIG. 3B illustrates detector 302 of machine 300. Detector 302 has field of view 415, which is shown as a square pyramid. Inspection region 450 may represent a portion of this pyramid, such as a portion extending a set distance above and below a focal plane of detector 302. In other words, inspection region 450 may represent inspection capabilities of detector 302. Orientation of detector 302 in spaces determines inspection-region location 460.

Referring generally to FIG. 3A and particularly to, e.g., FIGS. 3C-3D and 4A-4B, to identify processing location 440b on physical profile 230 of part 200, emitter 304 generates indicator 410b that extends through inspection region 450b and across physical profile 230. The preceding subject matter of this paragraph characterizes example 8 of the present disclosure, wherein example 8 also includes the subject matter according to any one of examples 6 or 7, above.

Processing location 440b may be a point on physical profile 230. To identify a particular point on a portion of physical profile 230 extending through inspection region 450b, emitter 304 generates indicator 410b extending through inspection region 450b and across physical profile 230. For example, processing location 440b may be defined as an intersection of indicator 410b and physical profile 230.

Indicator 410b may be an illumination of part 200 produced by emitter 304 and extending within inspection region 450b. Any illuminated portions of part 200 outside of inspection region 450b are not parts of indicator 410b. Any parts of physical profile 230 of part 200 that do not overlap with indicator 410b may be ignored. In some aspects, indicator 410b may be an illuminated planar beam produced by emitter 304. This planar beam may illuminate a line on the surface of part 200.

Referring generally to FIG. 3A and particularly to, e.g., FIGS. 4A and 6A, emitter 304 generates indicator 410b to be parallel with indicator 410a. The preceding subject matter of this paragraph characterizes example 9 of the present disclosure, wherein example 9 also includes the subject matter according to example 8, above.

Having parallel indicators, such as indicator 410b being parallel to indicator 410a, may expedite the overall inspection process since emitter 304 does not need to be rotated as emitter 304 is moved from one inspection region to another inspection region. Emitter 304 may be moved along physical profile 230 by changing its spatial coordinates but not its angle relative part 200.

In some aspects, parallel indicators may be used for straight portions of physical profile 230. The straight portions may be identified from the preexisting data, trending of previous processing locations, and other techniques. In some aspects, in addition to being parallel, each of indicator 410b and indicator 410a may be substantially perpendicular to physical profile 230.

Referring generally to FIG. 3A and particularly to, e.g., FIGS. 3C-3D and 4A-4B, emitter 304 generates indicator 410b to be non-parallel with indicator 410a. The preceding subject matter of this paragraph characterizes example 10 of the present disclosure, wherein example 10 also includes the subject matter according to example 8, above.

Angular orientation of each indicator 410b and indicator 410a relative to part 200 or, more specifically, relative to physical profile 230 may be independently controlled resulting in indicator 410b not being parallel with indicator 410a.

For example, the process may be designed to keep each of indicator 410b and indicator 410a being substantially perpendicular to physical profile 230. When physical profile 230 has a curvature, indicator 410b may not be parallel to indicator 410a, even though the orientation of each of indicator 410b and indicator 410a relative to physical profile 230 is the same.

In some aspects, emitter 304 producing indicator 410b and indicator 410a may be supported on a robotic arm, which can rotate emitter 304 relative to part 200 or, more specifically, relative to physical profile 230 in addition to moving it between different inspection regions. Furthermore, the same robotic arm may also support detector 302. As such, the orientation of indicator 410 relative to inspection region 450 may be set. In some examples, indicator 410 may be generated by a planar beam bisecting the inspection region. The angular orientation of inspection region 450 may change together with that of indicator 410.

Referring generally to FIGS. 3A and 6A-6C and particularly to, e.g., FIGS. 7A-7C, emitter 304 generates indicator 410b and indicator 410a to be substantially perpendicular to physical profile 230. The preceding subject matter of this paragraph characterizes example 11 of the present disclosure, wherein example 11 also includes the subject matter according to any one of examples 8-10, above.

In some aspects, accuracy of identifying processing location 440 relative to physical profile 230 may depend on the angular orientation of indicator 410 relative to physical profile 230. Indicator 410 being substantially perpendicular to physical profile 230 may yield the most accurate processing location 400 as will now be described with reference to FIGS. 6A-6C and FIGS. 7A-7C.

FIG. 6A illustrates an example in which indicator 410b is substantially perpendicular to physical profile 230, while indicator 410c is not perpendicular physical profile 230. In fact, the angle between indicator 410c and physical profile 230 may be less than 30°. FIG. 6B is a cross-sectional side view of part 200 in FIG. 6A at a location of indicator 410b. This figure shows that processing location 440b was identified very close (ΔB) to physical profile 230. FIG. 6C is a cross-sectional side view of part 200 in FIG. 6A at a location of indicator 410c. This figure shows that processing location 440c is identified further away (ΔC) from physical profile 230 than ΔB (the deviation for processing location 440b relative to physical profile 230). It has been determined that the accuracy of identifying physical profile 230 depends on the angle of indicator 410 relative to physical profile 230. The most precision has been achieved when indicator 410 is substantially perpendicular to physical profile 230. Without being restricted to any particular theory, it is believed that the perpendicular orientation produces the lowest light interference, shading, and other issues associated with accurate detection.

In some aspects, the angle between indicator 410a and physical profile 230 may be between about 80° and about 100°, between about 85° and about 95°, or between about 88° and about 92°. Likewise, the angle between indicator 410b and physical profile 230 may be between about 80° and about 100°, between about 85° and about 95°, or between about 88° and about 92°. The angle between indicator 410a and physical profile 230 and the angle between indicator 410b and physical profile 230 may differ by less than about 10° or even by less than about 5°. Physical profile 230 extending between processing location 440a and 440b may be straight or have a curvature. When this portion of physical profile 230 is straight, indicator 410a may be parallel to indicator 410b, in addition to indicator 410b and indicator 410a being substantially perpendicular to physical profile 230. However, when this portion of physical profile 230 has a curvature, indicator 410a may not be parallel to indicator 410b.

Referring generally to FIG. 3A and particularly to, e.g., FIGS. 4A-4B, method 100 also comprises identifying inspection-region location 460c based on processing location 440b. Inspection region 450c is geometrically associated with inspection-region location 460c. Method 100 also comprises identifying processing location 440c on physical profile 230 of part 200. Processing location 440c is within inspection region 450c. Method 100 additionally comprises generating at least the portion of path 470 also based on processing location 440c. The preceding subject matter of this paragraph characterizes example 12 of the present disclosure, wherein example 12 also includes the subject matter according to any one of examples 8-11, above.

In order for path 470 to be more representative of physical profile 230, multiple processing locations may need to be identified. If physical profile 230 is straight, two processing locations may be sufficient. In this case, generated path 470 may also be a straight line extending through these two processing locations. However, many physical profiles have curved shapes. Some curvatures may be predictable and known (e.g., from pre-existing data, such as a CAD model for part 200). However, other curvatures may not be predictable (e.g., due to flexibility of part 200). For curved shapes, additional processing locations may be needed to generate path 470 within a set tolerance from physical profile 230.

Operations associated with inspection-region location 460c may be the same as operations associated with inspection-region location 460b and described below. The similarity of these two sets of operations may be understood from FIGS. 4A and 4B.

For example, inspection-region location 460c is identified based on processing location 440b using one or more spatial coordinates of processing location 440b. In some aspects, other techniques may be used for identifying inspection-region location 460c, such as applying trending functions.

Likewise, inspection region 450c may be geometrically associated with inspection-region location 460c in the same way as inspection region 450b is geometrically associated with inspection-region location 460b. For example, inspection-region location 460c may be a center of inspection region 450c. Similar to inspection region 450b, inspection region 450c may be a truncated pyramid. In fact, inspection region 450c may viewed as inspection region 450b at a new location, i.e., inspection-region location 460c.

Identifying processing location 440c on physical profile 230 of part 200 may also be performed in the same manner as identifying processing location 440b. For example, processing location 440c may be identified on a portion of physical profile 230 extending through inspection region 450c or, more specifically, extending through inspection region 450c and intersecting indicator 410c.

Processing location 440c may be used for generating path 470 together with processing location 440a and processing location 440b. As stated above, using more processing locations 440 may yield path 470 that is more representative of physical profile 230.

Referring generally to FIG. 3A and particularly to, e.g., FIGS. 3C-3D and 4A-4B, to identify processing location 440c on physical profile 230 of part 200, emitter 304 generates indicator 410c that extends through inspection region 450c and across physical profile 230. The preceding subject matter of this paragraph characterizes example 13 of the present disclosure, wherein example 13 also includes the subject matter according to example 12, above.

Processing location 440c may be a point on physical profile 230. To identify a particular point on a portion of physical profile 230 extending through inspection region 450b, emitter 304 generates indicator 410c. Indicator 410c extends through inspection region 450c and across physical profile 230. For example, processing location 440c may be defined as an intersection of indicator 410c and physical profile 230.

For every inspection region, a new indicator extending through that inspection region and across physical profile 230 is generated. The process of generating indicator 410c may be similar to generating indicator 410a and 410b described above. In fact, indicator 410c may be viewed as indicator 410c moved into a new location. In some aspects, indicator 410 is moved together with inspection region 450 and every new inspection region 450 will have new indicator.

Referring generally to FIG. 3A and particularly to, e.g., FIGS. 4A and 4B, a distance between processing location 440a and processing location 440b is equal to a distance between processing location 440b and processing location 440c. The preceding subject matter of this paragraph characterizes example 14 of the present disclosure, wherein example 14 also includes the subject matter according to any one of examples 12 or 13, above.

Processing locations may be spaced at equal distances from each other such that the distance between processing location 440a and processing location 440b is equal to the distance between processing location 440b and processing location 440c. This approach may be used to ensure that any unexpected features are not missed with frequent inspections. Furthermore, when some information is available about at least a portion of physical profile 230 including processing location 440a, processing location 440b, and processing location 440c, equal distances may be used to obtain fast yet precise path 470. For example, a portion of physical profile 230 may be straight.

The distance between a pair of processing locations, such as the distance between processing location 440a and processing location 440b or between processing location 440b and processing location 440c, may be identified based on preexisting data (e.g., the CAD model defining the curvature of physical profile), overall length of physical profile 230, allowed inspection time, and/or other factors. In one example, the distance between processing locations 440a and 440b may be the same as the distance between processing locations 440b and 440c. This distance may be between about 100 mm and about 1000 mm, between about 150 mm and about 500 mm, or between about 200 mm and about 300 mm for generally straight portions of physical profile 230 and between about 10 mm and about 100 mm, between about 15 mm and about 50 mm, or between about 20 mm and about 30 mm for curved portions of physical profile 230.

Referring generally to FIG. 3A and particularly to, e.g., FIGS. 4A-4B and FIG. 9, a distance between processing location 440a and processing location 440b is different than a distance between processing location 440b and processing location 440c. The preceding subject matter of this paragraph characterizes example 15 of the present disclosure, wherein example 15 also includes the subject matter according to any one of examples 12 or 13, above.

Curvature of physical profile 230 may change from one processing location to another. To ensure that a sufficient number of processing locations is identified for each portion of physical profile 230, the distance between these processing locations may be changed with more frequent inspections performed at curved portions and less frequent inspections performed at straight portions. While frequency of inspections generally yields more precise path 470, some portions of physical profile (e.g., straight portions, portions known from the pre-existing data) do not benefit from this more frequent inspection approach. On the other hand, more frequent inspections result in slower processing time.

For example, a portion of physical profile 230 extending through processing location 440a may be straight, while a different portion of physical profile 230 extending through processing location 440c may be curved. Since more processing locations are needed to represent the curved portion of the physical profile 230, the distance between processing location 440a and processing location 440b may be greater than the distance between processing location 440b and processing location 440c. In some aspects, a ratio of the distance between processing location 440a and processing location 440b to the distance between processing location 440b and processing location 440c may be between about 2 and about 20 or, more specifically, between about 5 and about 10.

Referring generally to FIG. 3A and particularly to, e.g., FIGS. 6A-6C and 7A-7C, an angle between indicator 410a and indicator 410b is different than an angle between indicator 410b and indicator 410c. The preceding subject matter of this paragraph characterizes example 16 of the present disclosure, wherein example 16 also includes the subject matter according to any one of examples 12-15, above.

Relative angles between pairs of indicators may be changed to, for example, accommodate different curvatures of different portions of physical profile 230. For example, a portion of physical profile 230 extending through processing locations 440a and 440b may be straight, while a different physical profile 230 including extending through processing location 440c may be curved. In this example, indicator 410a may be parallel to indicator 410b. However, indicator 410c may not be parallel to indicator 410b.

Referring generally to FIG. 3A and particularly to, e.g., FIGS. 8 and 9A, identifying inspection-region location 460c based on processing location 440a and processing location 440b comprises applying a trending function to processing location 440a and processing location 440b. The preceding subject matter of this paragraph characterizes example 17 of the present disclosure, wherein example 17 also includes the subject matter according to any one of examples 12-16, above.

When one or more portions of physical profile 230 have significant curvatures, there is a high risk of not being able to identify any processing locations at these portions if inspection-region locations do not follow this curvature. With some curvatures, applying one or more spatial coordinates of the last processing location may not be sufficient and a trending function may need to be used instead as will not be described with reference to FIGS. 8 and 9A.

Specifically, FIG. 8 illustrates a schematic planar (X-Y) view of physical profile 230 including processing locations 440a and 440b. If Y-coordinate of processing location 440b is used a Y-coordinate for new inspection-region location 410c', then corresponding inspection region 460c' may not overlap with physical profile 230 as further illustrated in FIG. 9A showing an expanded view of a portion of physical profile 230 around processing locations 440b and 440c. Inspection region 460c' is simply too far from physical profile 230. If this inspection region 460c' is used, no physical locations will be identified.

FIG. 8 also illustrates trend line 810 extending through processing locations 440a and 440b. If inspection-region location 460c is positioned on this trend line 810, its inspection region 460c may be sufficiently close to physical profile 230 as, for example, shown in FIG. 9A. Specifically, inspection region 460c may overlap with physical profile 230 and processing location 440c may be identified.

Referring generally to FIG. 3A and particularly to, e.g., FIGS. 8A-8B, the trending function is a linear trending function. The preceding subject matter of this paragraph characterizes example 18 of the present disclosure, wherein example 18 also includes the subject matter according to example 17, above.

A linear trending function needs two points and can be used as soon as two processing locations are identified. Furthermore, a linear trending function may be sufficiently representative of some portions of physical profile, such as sagging of straight parts. Finally, applying a linear trending function may save computational resources to implement other tasks, such as identifying additional processing locations, which may be more beneficial than trying to determine the most representative trending function.

One example of a linear trending function is shown in FIGS. 8 and 9A. Specifically, trend line 810 extends through processing location 440a and 440b and is used to identify inspection-region location 460c.

Referring generally to FIG. 3A and particularly to, e.g., FIGS. 8A-8B, the trending function is a non-linear trending function. The preceding subject matter of this paragraph characterizes example 19 of the present disclosure, wherein example 19 also includes the subject matter according to example 17, above.

In some examples, a non-linear trending function may provide a better fit for identified processing locations than, for example, a linear function. A non-linear trending function may be selected from a database of available trending functions. The database may be specific for a particular part or may be a general database. In some aspects, pre-existing data may be used to select a non-linear trending function.

One examples of non-linear trending function include a circular function, which may be used to represent round portions of physical profile 230.

Referring generally to FIG. 3A and particularly to, e.g., FIGS. 4A-4B, inspection-region location 460b is preset distance 480 away from processing location 440a. The preceding subject matter of this paragraph characterizes example 20 of the present disclosure, wherein example 20 also includes the subject matter according to any one of examples 12-19, above.

In order to advance inspection of physical profile 230, preset distance 480 may be used to move to the next inspection-region location. The reference point may be the last processing location. As such, inspection-region location 460b is preset distance 480 away from processing location 440a as, for example, shown in FIGS. 4A and 4B.

In some aspects, preset distance 480 includes only one spatial coordinate component, e.g., X-coordinate as shown in FIGS. 4A and 4B. Alternatively, preset distance 480 may include two (X and Y; X and Z) or three (X, Y, and Z) coordinate components. Present distance 480 may be selected based on the curvature of physical profile 230 at the last processing location.

Referring generally to FIG. 3A and particularly to, e.g., FIGS. 4A-4B, preset distance 480 is selected based on pre-existing data relating to the shape of physical profile 230 of part 200. The preceding subject matter of this paragraph characterizes example 21 of the present disclosure, wherein example 21 also includes the subject matter according to example 20, above.

Pre-existing data relating to the shape of physical profile 230 of part 200 may be used to ensure that the selected preset distance 480 provides fast inspection throughout and captures enough processing locations to generate representative path 470. The pre-existing data may also indicate that different preset distance 480 may be used for different portions of physical profile 230. Various pre-existing data relating to the shape of physical profile 230 of part 200 may be used to select preset distance 480, such as curvature of physical profile 230 obtained from a CAD model, information about previous inspections.

For example, preset distance 480 may be selected based on the curvature of physical profile 230 at the last processing location. For straight portions of physical profile 230 preset distance 480 may be between about and 100 mm and 1000 mm or, more specifically, between 150 mm and 500 mm or even between about 200 mm and 300 mm. For curved portions of physical profile 230 preset distance 480 may be between about 10 mm and 100 mm or, more specifically, between 15 mm and 50 mm or even between about 20 mm and 30 mm.

Referring generally to FIG. 3A and particularly to, e.g., FIGS. 4A-4B, inspection-region location 460c is preset distance 482 away from processing location 440b. The preceding subject matter of this paragraph characterizes example 22 of the present disclosure, wherein example 22 also includes the subject matter according to any one of examples 12-21, above.

In order to advance inspection of physical profile 230, preset distance 482 may be used to move to the next inspection-region location. The reference point may be the last processing location. As such, inspection-region location 460c is preset distance 482 away from processing location 440b as, for example, shown in FIGS. 4A and 4B.

In some aspects, preset distance 482 includes only one spatial coordinate component, e.g., X-coordinate as shown in FIGS. 4A and 4B. Alternatively, preset distance 482 may include two (X and Y; X and Z) or three (X, Y, and Z) coordinate components. Present distance 482 may be selected based on the curvature of physical profile 230 at the last processing location. In some aspects, selection of preset distance 482 is based on same process as selection of present distance 480.

Referring generally to FIG. 3A and particularly to, e.g., FIGS. 4A-4B, preset distance 482 is selected based on pre-existing data relating to the shape of physical profile 230 of part 200. The preceding subject matter of this paragraph characterizes example 23 of the present disclosure, wherein example 23 also includes the subject matter according to example 22, above.

Pre-existing data relating to the shape of physical profile 230 of part 200 may be used to ensure that preset distance 482 provides fast inspection throughout and captures enough processing locations to generate representative path 470. The pre-existing data may also indicate that different preset distances may be used for different portions of physical profile 230 (e.g., present distance 480 may be different from present distance 482). Various pre-existing data relating to the shape of physical profile 230 of part 200 may be used to select preset distance 482, such as curvature of physical profile 230 obtained from a CAD model, information about previous inspections.

For example, preset distance 482 may be selected based on the curvature of physical profile 230 at the last processing location. For straight portions of physical profile 230 preset distance 420 may be between about and 100 mm and 1000 mm or, more specifically, between 150 mm and 500 mm or even between about 200 mm and 300 mm. For curved portions of physical profile 230 preset distance 482 may be between about 10 mm and 100 mm or, more specifically, between 15 mm and 50 mm or even between about 20 mm and 30 mm.

Referring generally to FIG. 3A and particularly to, e.g., FIGS. 2 and 9, preset distance 482 is selected based on applying a trending function to processing location 440a and processing location 440b. The preceding subject matter of this paragraph characterizes example 24 of the present disclosure, wherein example 24 also includes the subject matter according to example 22, above.

When one or more portions of physical profile 230 have significant curvatures, there is a high risk of not being able to identify any processing locations at these portions if inspection-region locations do not follow this curvature. With some curvatures, applying one or more spatial coordinates of the last processing location may not be sufficient and a trending function may need to be used instead as will not be described with reference to FIGS. 8 and 9A.

Specifically, FIG. 8 illustrates a schematic planar (X-Y) view of physical profile 230 including processing locations 440a and 440b. If Y-coordinate of processing location 440b is used a Y-coordinate for new inspection-region location 460c', then corresponding inspection region 450c' may not overlap with physical profile 230 as further illustrated in FIG. 9A showing an expanded view of a portion of physical profile 230 around processing locations 440b and 440c. Inspection region 460c' is simply too far from physical profile 230. If this inspection region 460c' is used, no physical locations will be identified.

FIG. 8 also illustrates trend line 810 extending through processing locations 440a and 440b. If inspection-region location 460c is positioned on this trend line 810, its inspection region 450c may be sufficiently close to physical profile 230 as, for example, shown in FIG. 9A. Specifically, inspection region 450c may overlap with physical profile 230 and processing location 440c may be identified.

Referring generally to FIG. 3A and particularly to, e.g., FIGS. 2 and 9, the trending function is a linear trending function. The preceding subject matter of this paragraph characterizes example 25 of the present disclosure, wherein example 25 also includes the subject matter according to example 24, above.

A linear trending function needs two points and can be used as soon as two processing locations are identified. Furthermore, a linear trending function may be sufficiently representative of some portions of physical profile, such as sagging of straight parts. Finally, applying a linear trending function may save computational resources to implement other tasks, such as identifying additional processing locations, which may be more beneficial than trying to determine the most representative trending function.

One example of a linear trending function is shown in FIGS. 8 and 9A. Specifically, trend line 810 extends through processing location 440a and 440b and is used to identify inspection-region location 410c.

Referring generally to FIG. 3A and particularly to, e.g., FIGS. 2 and 9, the trending function is a non-linear trending function. The preceding subject matter of this paragraph characterizes example 26 of the present disclosure, wherein example 26 also includes the subject matter according to example 24, above.

In some examples, a non-linear trending function may provide a better fit for identified processing locations than, for example, a linear function. A non-linear trending function may be selected from a database of available trending functions. The database may be specific for a particular part or may be a general database. In some aspects, pre-existing data may be used to select a non-linear trending function.

One examples of non-linear trending function include a circular function, which may be used to represent round portions of physical profile 230.

Referring generally to FIG. 3A and particularly to, e.g., FIGS. 4A and 4B, inspection region 450a and inspection region 450b have identical size and shape. The preceding subject matter of this paragraph characterizes example 27 of the present disclosure, wherein example 27 also includes the subject matter according to any one of examples 1-26, above.

When inspection region 450a and inspection region 450b have identical size and shape, the process of identifying inspection-region location 460b may be more straightforward then in the example when inspection region 450a and inspection region 450b have different size and/or shape and when any difference in size and/or shape needs to be accounted for.

Specifically, the difference between inspection-region location 460a (corresponding to inspection region 450a) and processing location 440a may be used to adjust inspection-region location 460b (corresponding to inspection region 450b) relative to inspection-region location 460a. This adjustment may be direct when the size and shape of inspection region 450a and inspection region 450b are identical.

Referring generally to FIG. 3A and particularly to, e.g., FIGS. 4A-4C, a spatial coordinate of inspection-region location 460b is identical to a spatial coordinate of processing location 440a. The preceding subject matter of this paragraph characterizes example 28 of the present disclosure, wherein example 28 also includes the subject matter according to any one of examples 1-27, above.

Inspection-region location 460b is identified based on processing location 440a to account for any deviations of processing location 440a relative to the expected location, which may be inspection-region location 460a. For example, part 200 may sag or otherwise deform and its processing locations may start deviating relative to the expected locations. If inspection-region locations are not adjusted, a processing location may be missed. A direct way of accounting for any deviations of processing location 440a is to use one or more of its spatial coordinates for inspection-region location 460b, which may be used for subsequent inspection.

Referring to FIG. 4A and FIG. 4C, processing location 440a has coordinates of $(X_A, Y_{A'})$. These coordinates are different from inspection-region location 460a, which are $(X_A, Y_A)$. If the Y-coordinate for subsequent inspection-region location 460b is not adjusted (e.g., if $Y_B=Y_A$), then physical profile 230 may not overlap with corresponding inspection region 450b' as shown in FIG. 4C. In this situation, the process will fail as no physical locations will be identified within inspection region 450b', shown in FIG. 4C.

Referring to FIG. 4A, the Y-coordinate for subsequent inspection-region location 460b may adjusted and made identical to the Y-coordinate of processing location 440a (e.g., $Y_B=Y_{A'}$). In this case, inspection region 450b will have a different spatial orientation in comparison to inspection region 450a ($Y_A \neq Y_{A'}$). By adapting the Y-coordinate of processing location 440a (e.g., $Y_B=Y_{A'}$) inspection region 450b is brought closer to physical profile 230 than, for example, inspection region 450b' shown in FIG. 4C. As a result, physical profile 230 still overlaps with inspection region 450b as shown in FIG. 4A. This operation may be used for other processing and inspection-region locations (e.g., $Y_C=Y_{C'}$). Furthermore, this approach may be used for other coordinates as, for example, shown in FIG. 4B (e.g., $Z_B=Z_{A'}$).

Referring generally to FIG. 3A and particularly to, e.g., FIGS. 4A and 4B, two spatial coordinates of inspection-region location 460b are identical to two spatial coordinates of processing location 440a. The preceding subject matter of this paragraph characterizes example 29 of the present disclosure, wherein example 29 also includes the subject matter according to any one of examples 1-27, above.

Inspection-region location 460b is identified based on processing location 440a to account for any deviations of processing location 440a relative to the expected location, which may be inspection-region location 460a. For example, part 200 may sag or otherwise deform and its processing locations may start deviating relative to the expected locations. If inspection-region locations are not adjusted, a processing location may be missed. A direct way of accounting for any deviations of processing location 440a is to use one or more of its spatial coordinates for inspection-region location 460b, which may be used for subsequent inspection.

As described above with reference to FIG. 4A, the Y-coordinate for subsequent inspection-region location 460b may adjusted and made identical to the Y-coordinate of processing location 440a (e.g., $Y_B=Y_{A'}$). In this case, inspection region 450b will have a different spatial orientation in comparison to inspection region 450a ($Y_A \neq Y_{A'}$). By adapting the Y-coordinate of processing location 440a (e.g., $Y_B=Y_{A'}$) inspection region 450b is brought closer to physical profile 230 than, for example, inspection region 450b' shown in FIG. 4C. This approach may be extended to multiple spatial coordinates, such as Y and Z spatial coordinates, e.g., (e.g., $Y_B=Y_{A'}$, and $Z_B=Z_{A'}$).

Referring generally to FIG. 3A and particularly to, e.g., FIGS. 4A and 4B, physical profile 230 is an interface edge between first component 210 and second component 220 of part 200. The preceding subject matter of this paragraph characterizes example 30 of the present disclosure, wherein example 30 also includes the subject matter according to any one of examples 1-27, above.

Identifying physical profile 230, which is an interface edge between first component 210 and second component 220 of part 200, may be particularly challenging because first component 210 and second component 220 may have different characteristics (e.g., color, surface finish, and other characteristics that may be relevant to inspection) and, in some aspects, may behave differently (e.g., deform differently).

Various interfaces between first component 210 and second component 220 are possible. For example as shown in FIG. 3A, first component 210 may be positioned on second component surface 222 of second component 220. In this example, physical profile 230 may be at the interface of main surface 222 of second component 220 and side surface 214 of first component 210. Side surface 214 of first component 210 and main surface 222 of second component 220 may be at an angle of between about 0° and about 180° with respect to each other or, more specifically, between about 30° and about 150° or even between about 60° and about 120°. In some aspects, physical profile 230 may be at the interface of main surface 222 of second component 220 and main surface 212 of first component 210, which may be coplanar.

Referring generally to FIG. 3A and particularly to, e.g., FIG. 2, first component 210 is a stringer and second component 220 is a wing skin. The preceding subject matter of this paragraph characterizes example 31 of the present disclosure, wherein example 31 also includes the subject matter according to example 30, above.

Wing skins and stringers used for reinforcement of wing structures are long and flexible parts, which are particularly difficult to inspect and process because of their size and flexibility. The interface between wing skin and stringer may need to be sealed and identifying the sealant path is challenging.

During inspection and then later during processing, the wing structure comprising a wing skin and stringer may be supported on a fixture. Depending on the design of this wing structure, position of the wing structure on the support, and other aspects, physical profile 230 between first component 210, which may be the stringer, and second component 220, which may be the wing skin, may vary and precise construction of path 470 is important.

Referring generally to FIG. 3A and particularly to, e.g., FIGS. 10A-10D, generating at least the portion of path 470 comprises applying a fitting function to processing location 440a and processing location 440b. The preceding subject matter of this paragraph characterizes example 32 of the present disclosure, wherein example 32 also includes the subject matter according to any one of examples 1-31, above.

The increase in distance between processing location 440a and processing location 440b improves efficiency of the inspection process but generally decreases the accuracy of approximating physical profile 230 with path 470. Some accuracy can be gained by applying a fitting function to processing location 440a and processing location 440b that can precisely estimate positions of other points on physical profile 230 between processing location 440a and processing location 440b.

For example, if processing location 440a and processing location 440b represent a straight portion of physical profile 230, then a fitting function applied to processing location 440a and processing location 440b may be a straight line. In other words, a straight line may be used to connect processing location 440a and processing location 440b. Alternatively, if processing location 440a and processing location 440b represent a curved portion of physical profile 230, then a fitting function applied to processing location 440a and processing location 440b may try to simulate physical profile 230 as, for example, shown in FIG. 10C. The fitting function may be one or more mathematical functions, e.g., $Y=f(X)$ and $Z=f(X)$. The same function may be used for all identified processing location or different functions may be used for subsets of all identified processing locations. In some aspects, the fitting function may be based on preexisting data.

Referring generally to FIG. 3A and particularly to, e.g., FIGS. 10A-10D, path 470 does not comprise at least one of processing location 440a and processing location 440b. The preceding subject matter of this paragraph characterizes example 33 of the present disclosure, wherein example 33 also includes the subject matter according to example 32, above.

Referring generally to FIG. 3A and particularly to, e.g., FIGS. 10A-10D, path 470 comprises processing location 440a and processing location 440b. The preceding subject matter of this paragraph characterizes example 34 of the present disclosure, wherein example 34 also includes the subject matter according to any one of examples 1-32, above.

Processing location 440a and processing location 440b are identified on physical profile 230 of part 200. As such, including processing locations 440a and 440b into path 470 may yield path 470 closest to physical profile 230 of part 200. The proximity between path 470 and physical profile 230 is one of the main goals of generating path 470. At least the deviation between any point on path 470 and closest point on physical profile 230 (shown as $\Delta Max_1$ and $\Delta Max_2$ in FIG. 10A) may be less than the acceptable tolerance.

Figure 10A:
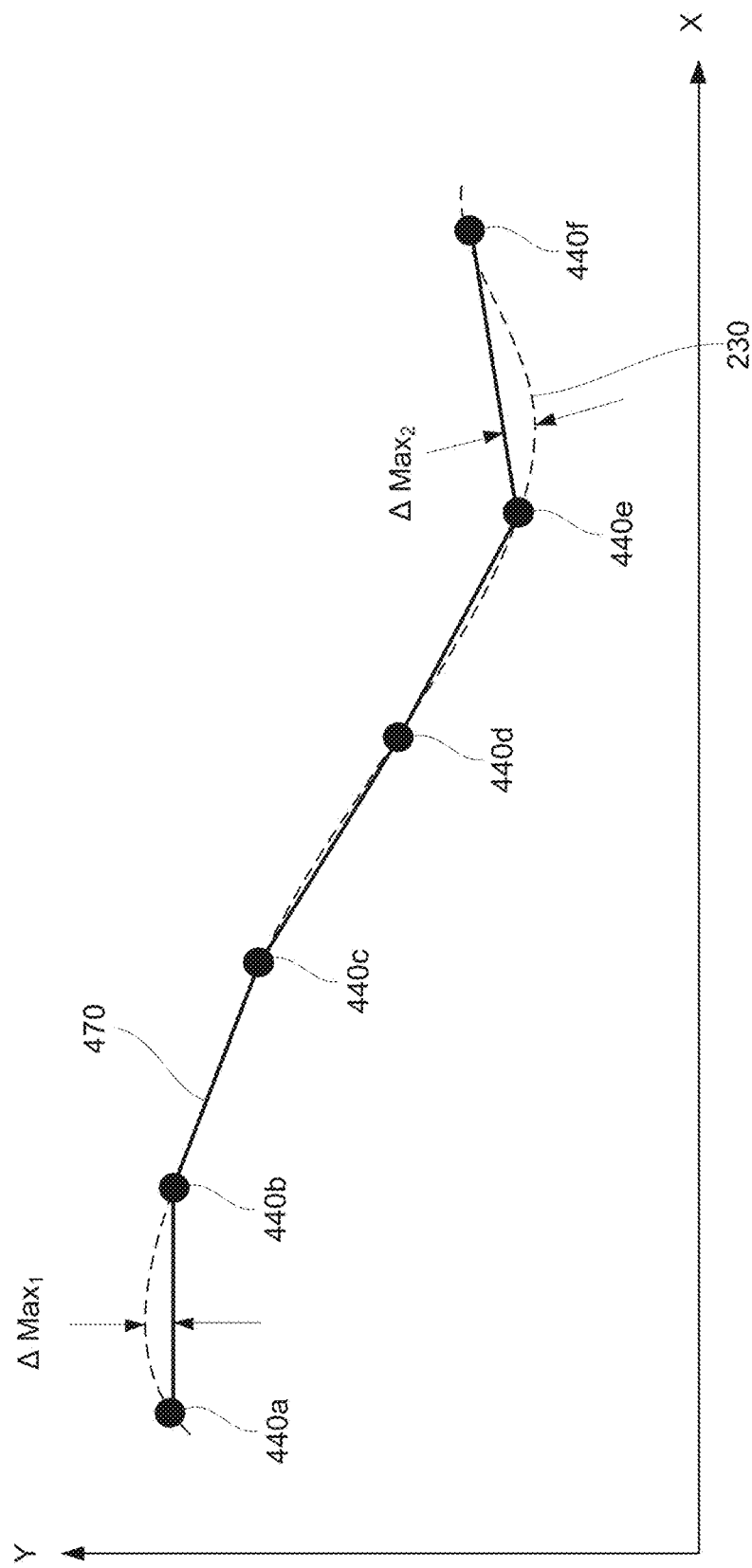
Figure 10B:
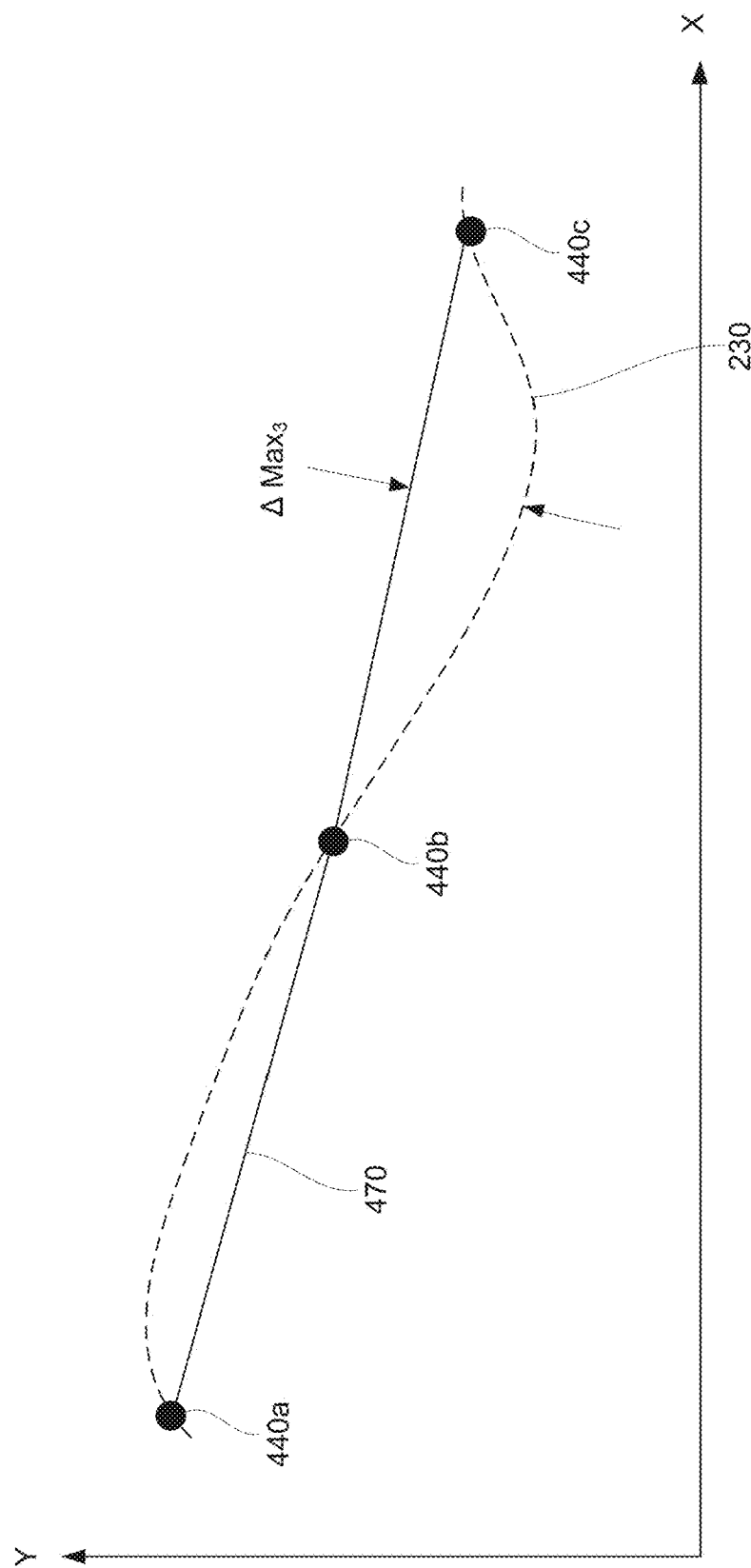
Figure 10C:
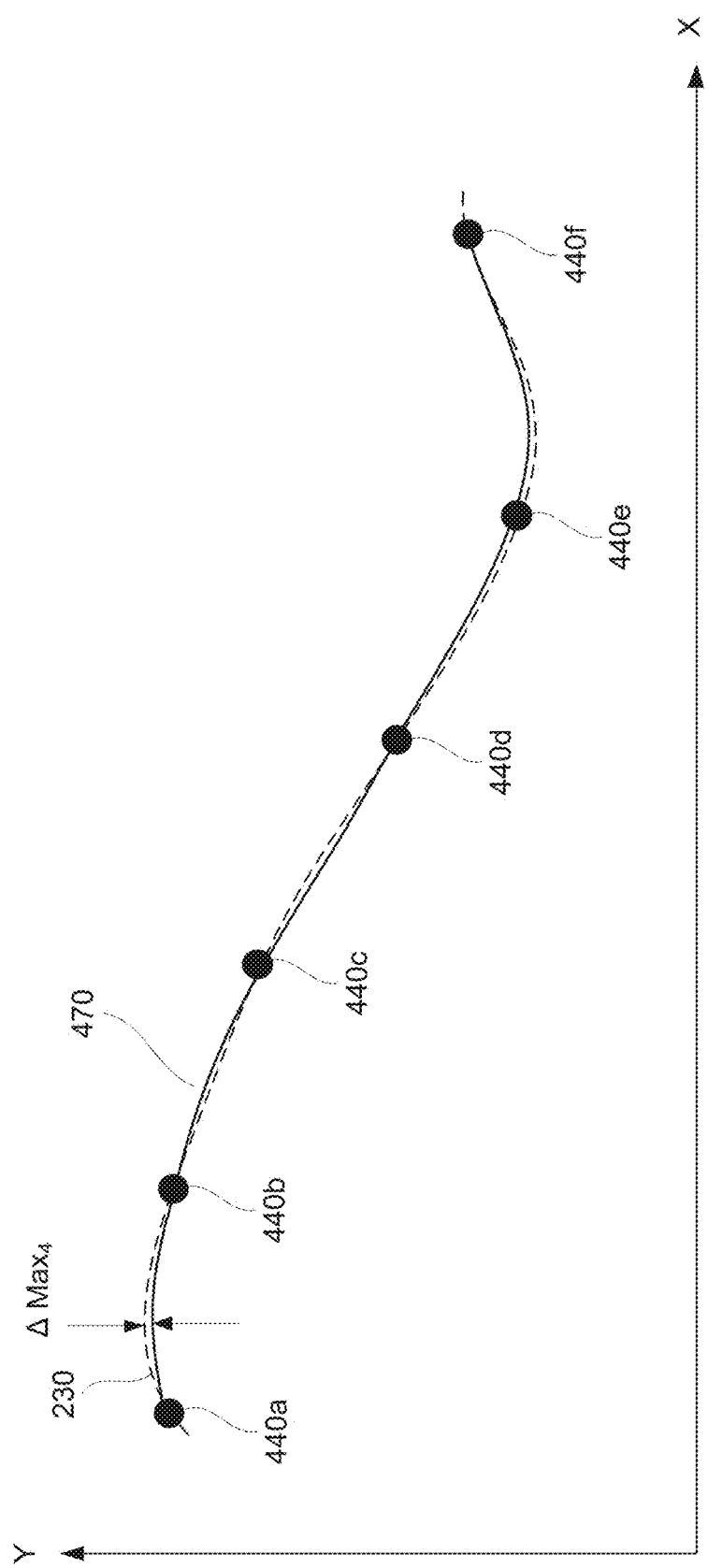
Figure 10D:
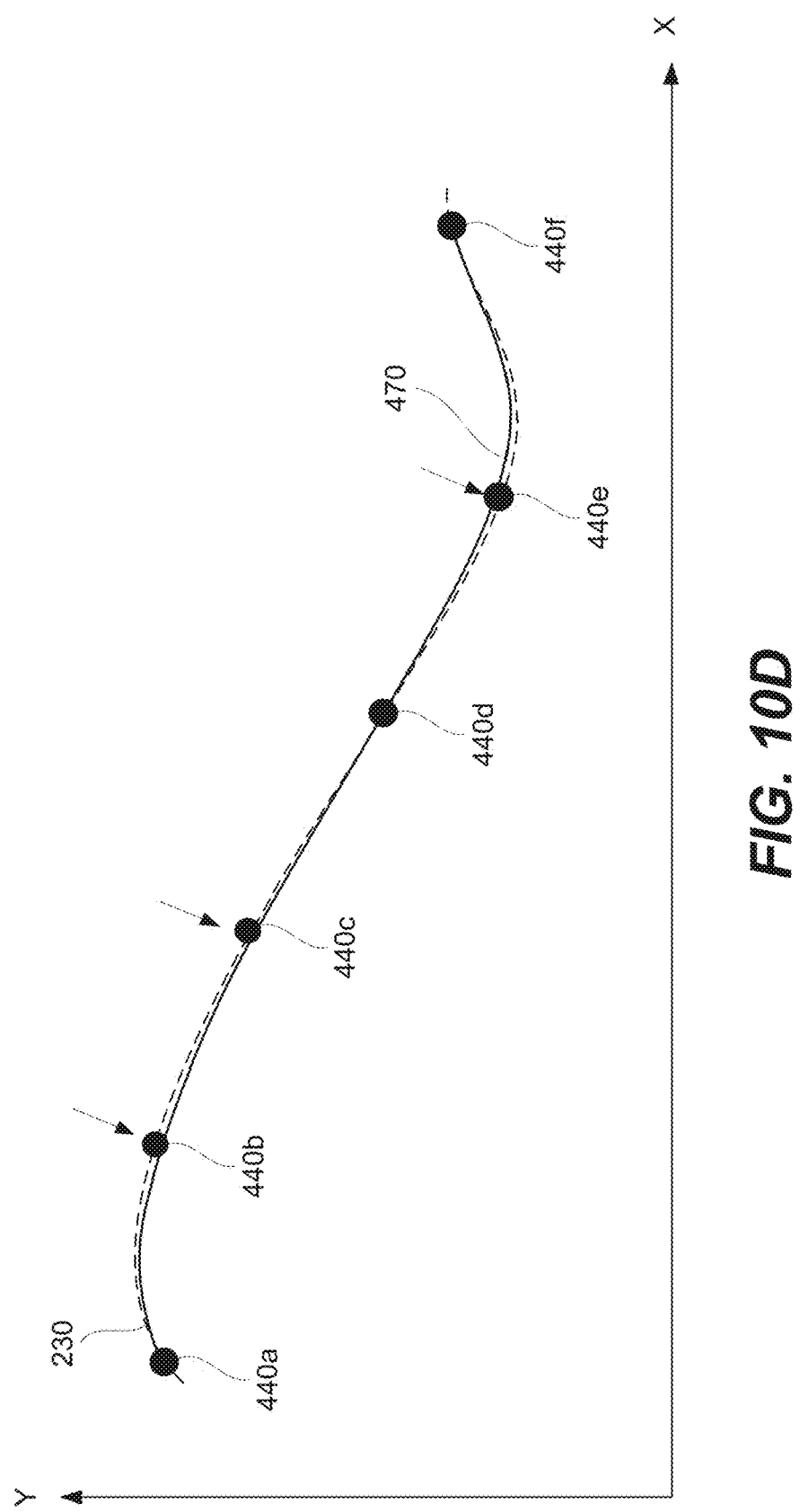

Path 470 may comprise processing location 440a and processing location 440b when, for example, path 470 is constructed by connecting processing location 440a and processing location 440b using a straight line (as, for example, shown in FIG. 10A) or curved lines (as, for example, shown in FIG. 10C). The type of connecting lines may be determined based on the resulting proximity between path 470 and physical profile 230 between processing location 440a and processing location 440b. For example, the maximum deviation between path 470 and physical profile 230 (connecting processing location 440a and processing location 440b) is less in the example shown in FIG. 10C than in the example shown in FIG. 10A ($\Delta Max_4 < \Delta Max_1$). As such, when selecting between these two examples, connecting processing location 440a and processing location 440b with a curved line, as presented in the example in FIG. 10C, yields better results. The type of line connecting processing location 440a and processing location 440b or, more specifically, the curvature of the line may be selected based on a fitting function applied to processing location 440a and processing location 440b and possibly and other processing locations. Furthermore, the type of line connecting processing location 440a and processing location 440b may be selected based on pre-existing data (e.g., a CAD model corresponding to these processing locations or data for previously processed parts).

Referring generally to FIG. 1 and particularly to, e.g., FIG. 3G, generating at least a portion of path 470 comprises determining orientation of tool 303 relative to physical profile 230. The preceding subject matter of this paragraph characterizes example 35 of the present disclosure, wherein example 35 also includes the subject matter according to any one of examples 1-34, above.

Location of path 470 on its own may sometimes not be sufficient to operate tool 303. For example, some features of part 200 may interfere with tool 303. As shown in FIG. 3G, part 200 includes first component 210 disposed on second component surface 222. If physical profile 230 is positioned at the interface of first component 210 and second component 220 as, for example, shown in FIG. 3G, then first component 210 may interfere tool 303 (e.g., angle $\alpha_Y$ identified in FIG. 3G cannot exceed 90° if first component 210 extends vertically from second component surface 222).

In the same or other example, tool 303 may need particular processing angles relative to path 470. These angles may be determined based on the processing technique, such as application of a compound along path 470.

In some aspects, orientation of tool 303 relative to physical profile 230 may be defined by two angles of tool 303 or, more specifically, or center axis 303a or tool 303 relative to the fixed coordinate system. FIG. 3G illustrates angles $\alpha_x$ and $\alpha_Y$ that can be used for these purposes. These angles may be selected based on the shape of physical profile 230 (e.g., pre-existing data related to the shape of physical profile 230 of part 200), other data about part 200 (e.g., relative orientations and shapes of first component 210 and second component 220), generated path 470, and other information. In some aspects, orientation of tool 303 may be determined based on capabilities of tool 303 and various functions performed by tool 303. For example, tool 303 may be positioned in the same support together with detector 302 and emitter 304 and the orientation of tool 303 may be, at least in part, effected by operations of detector 302 and emitter 304. Orientation of tool 303 relative to physical profile 230 may change at different location along physical profile 230.

Referring generally to FIG. 3A and particularly to, e.g., FIGS. 3B, 3E and 3F, inspection-region location 460b is a center of inspection region 450b. The preceding subject matter of this paragraph characterizes example 36 of the present disclosure, wherein example 36 also includes the subject matter according to any one of examples 1-35, above.

While any inspection-region location 460b may be used as a reference, having inspection-region location 460b at the center of inspection region 450b makes the process of identifying inspection-region location 460b based on processing location 440a much more straightforward. This straightforward approach, in turn, result in a more direct setup of the inspection process, fewer computing resources needed, and other advantages, which will be apparent to one skilled in the art. It will be readily understood that processing location 440b has to be within inspection region 450b in order for processing location 440b to be detected. It will be also understood that the likelihood of processing location 440b being within inspection region 450b depends on the proximity of processing location 440b and the center of inspection region 450b among other factors (e.g., the size of inspection region 450b which generally needs to kept to be minimized to ensure high inspection precision). As such, selecting the center of inspection region 450b for inspection-region location 460b makes the task of centering inspection region 450b with respect to processing location 440b more straightforward, i.e., position inspection-region location 460b at an expected position of processing location 440b.

The position of the center of inspection region 450b depends on the shape of inspection region 450b. FIGS. 3B, 3E, and 3F show inspection region 450b being a truncated pyramid or, more specifically, a truncated pyramid with a rectangular base or even a truncated pyramid with a square base. Inspection region 450b has upper boundary 452 and lower boundary 454 defining the height of inspection region 450b. Inspection-region location 460b may be located on a plane equally spaced between upper boundary 452 and lower boundary 454 as, for example, shown in FIG. 3E. In some aspects, this plane is also focal plane 412 of detector 302. Furthermore, inspection-region location 460b may be positioned in the center of the area defined by the intersection of this plane with inspection region 450b. For example, FIG. 3F illustrates the intersection of plane 412 and inspection region 450b being a square and inspection-region location 460b positioned in the center of this square. One skilled in the art would understand how to determine centers of other 3D shapes that may be used as inspection regions.

Referring generally to FIG. 1 and particularly to, e.g., FIG. 3A, method 100 further comprises applying substance to part 200 along path 470. The preceding subject matter of this paragraph characterizes example 37 of the present disclosure, wherein example 37 also includes the subject matter according to any one of examples 1-36, above.

Because path 470 is generated to precisely follow physical profile 230, application of the substance or any other process performed along path 470 also performed at or close to physical profile 230. In some aspects, this proximity is less than the allowable tolerance. As such, the substance is applied where it is needed, i.e., at the physical profile.

The substance may be applied using a tool, such as an applicator or, more specifically, a brush applicator or a bead applicator. The substance can be a paste like fluid, such a sealant or an adhesive. In some aspects, the substance may be applied after path 470 is completely generated. Alternatively, the substance may be applied as soon as a portion of path 470 is generated (but not entire path 470). As such, the substrate may be applied while remaining portions of path 470 are being generated and, in some aspects, while remaining processing locations 440 are being identified.

Referring generally to FIG. 3A and particularly to, e.g., FIGS. 1 and 12, machine-readable program 1222 for causing machine 300 to generate path 470 for processing physical profile 230 of part 200 by performing operations, comprising identifying processing location 440a on physical profile 230 of part 200. Processing location 440a is within inspection region 450a. The operations also comprise identifying inspection-region location 460b based on processing location 440a. Inspection region 450b is geometrically associated with inspection-region location 460b. The operations additionally comprise identifying processing location 440b on physical profile 230 of part 200. Processing location 440b is within inspection region 450b. The operations also comprise generating at least a portion of path 470 based on processing location 440a and processing location 440b. The preceding subject matter of this paragraph characterizes example 38 of the present disclosure.

Operations of the method described above nay be performed by machine 300. The instructions for machine may be in the form of machine readable program 1222. Various aspects of these operations and machine 300 are described above.

Some aspects of machine readable program 1222 are described below with reference to FIG. 12. For example, machine readable media 1220 may include program code 1218, which may also referred to as a source code, computer readable storage media 1224 and/or optional computer readable signal media 1226. In some aspects, machine readable media 1220 does not include computer readable signal media 1226.

Referring generally to FIG. 3A and particularly to, e.g., FIGS. 1 and 12, computer system 1200 for causing machine 300 to generate path 470 for processing physical profile 230 of part 200 is provided. Computer system 1200 comprises processor 1204 programmed to cause machine 300 to perform operations that comprise identifying processing location 440a on physical profile 230 of part 200. Processing location 440a is within inspection region 450a. The operations also comprise identifying inspection-region location 460b based on processing location 440a. Inspection region 450b is geometrically associated with inspection-region location 460b. The operations additionally comprise identifying processing location 440b on physical profile 230 of part 200. Processing location 440b is within inspection region 450b. The operations further comprise generating at least a portion of path 470 based on processing location 440a and processing location 440b. Computer system 1200 comprises memory 1206 for storing data representing processing location 440a, inspection-region location 460b, processing location 440b, and at least the portion of path 470. The preceding subject matter of this paragraph characterizes example 39 of the present disclosure.

Operations of the method described above nay be performed by machine 300. Computer system 1200 for causing machine 300 to generate path 470 for processing physical profile 230 of part 200. Various aspects of these operations and machine 300 are described above.

Some aspects of computer system 1200 are described below with reference to FIG. 12. For example, computer system 1200 comprises processor 1204 programmed to cause machine 300 to perform various operations described above. Processor 1204 serves to execute instructions for software that may be loaded into memory 1206. Processor 1204 may be a number of processors, a multi-processor core, or some other type of processor, depending on the particular implementation. Computer system 1200 may comprise memory 1206 for storing various data, such as data representing processing location 440*a*, inspection-region location 460*b*, processing location 440*b*, and at least the portion of path 470. In some examples, memory 1206 also stores pre-existing data, such as CAD information of part 200.

Turning now to FIG. 12, an illustration of data processing system 1200 is depicted in accordance with some examples. Data processing system 1200 may be used to implement one or more computers used in a controller or other components of various systems described above. In some examples, data processing system 1200 includes communications framework 1202, which provides communications between processor 1204, memory 1206, persistent storage 1208, communications unit 1210, input/output (I/O) unit 1212, and display 1214. In this example, communications framework 1202 may take the form of a bus system.

Processor 1204 serves to execute instructions for software that may be loaded into memory 1206. Processor 1204 may be a number of processors, a multi-processor core, or some other type of processor, depending on the particular implementation.

Memory 1206 and persistent storage 1208 are examples of storage devices 1216. A storage device is any piece of hardware that is capable of storing information, such as, for example, without limitation, data, program code in functional form, and/or other suitable information either on a temporary basis and/or a permanent basis. Storage devices 1216 may also be referred to as computer-readable storage devices in these illustrative examples. Memory 1206, in these examples, may be, for instance, a random access memory or any other suitable volatile or non-volatile storage device. Persistent storage 1208 may take various forms, depending on the particular implementation. For example, persistent storage 1208 may contain one or more components or devices. For example, persistent storage 1208 may be a hard drive, a flash memory, a rewritable optical disk, a rewritable magnetic tape, or some combination of the above. The media used by persistent storage 1208 also may be removable. For example, a removable hard drive may be used for persistent storage 1208.

Communications unit 1210, in these illustrative examples, provides for communications with other data processing systems or devices. In these illustrative examples, communications unit 1210 is a network interface card.

Input/output unit 1212 allows for input and output of data with other devices that may be connected to data processing system 1200. For example, input/output unit 1212 may provide a connection for user input through a keyboard, a mouse, and/or some other suitable input device. Further, input/output unit 1212 may send output to a printer. Display 1214 provides a mechanism to display information to a user.

Instructions for the operating system, applications, and/or programs may be located in storage devices 1216, which are in communication with processor unit 1204 through communications framework 1202. The processes of the different examples may be performed by processor unit 1204 using computer-implemented instructions, which may be located in a memory, such as memory 1206.

These instructions are referred to as program code, computer-usable program code, or computer-readable program code that may be read and executed by a processor in processor unit 1204. The program code in the different examples may be embodied on different physical or computer-readable storage media, such as memory 1206 or persistent storage 1208.

Program code 1218 is located in a functional form on computer-readable media 1220 that is selectively removable and may be loaded onto or transferred to data processing system 1200 for execution by processor unit 1204. Program code 1218 and computer-readable media 1220 form computer program product 1222 in these illustrative examples. In one example, computer-readable media 1220 may be computer-readable storage media 1224 or computer-readable signal media 1226.

In these illustrative examples, computer-readable storage media 1224 is a physical or tangible storage device used to store program code 1218 rather than a medium that propagates or transmits program code 1218.

Alternatively, program code 1218 may be transferred to data processing system 1200 using computer-readable signal media 1226. Computer-readable signal media 1226 may be, for example, a propagated data signal containing program code 1218. For example, computer-readable signal media 1226 may be an electromagnetic signal, an optical signal, and/or any other suitable type of signal. These signals may be transmitted over communications links, such as wireless communications links, optical fiber cable, coaxial cable, a wire, and/or any other suitable type of communications link.

The different components illustrated for data processing system 1200 are not meant to provide architectural limitations to the manner in which different examples may be implemented. The different illustrative examples may be implemented in a data processing system including components in addition to and/or in place of those illustrated for data processing system 1200. Other components shown in FIG. 12 can be varied from the illustrative examples shown. The different examples may be implemented using any hardware device or system capable of running program code 1218.

Examples of the present disclosure may be described in the context of aircraft manufacturing and service method 1100 as shown in FIG. 11A and aircraft 1102 as shown in FIG. 11B. During pre-production, illustrative method 1100 may include specification and design (block 1104) of aircraft 1102 and material procurement (block 1106). During production, component and subassembly manufacturing (block 1108) and system integration (block 1110) of aircraft 1102 may take place. Thereafter, aircraft 1102 may go through certification and delivery (block 1112) to be placed in service (block 1114). While in service, aircraft 1102 may be scheduled for routine maintenance and service (block 1116). Routine maintenance and service may include modification, reconfiguration, refurbishment, etc. of one or more systems of aircraft 1102.

Each of the processes of illustrative method 1100 may be performed or carried out by a system integrator, a third party, and/or an operator (e.g., a customer). For the purposes of this description, a system integrator may include, without limitation, any number of aircraft manufacturers and major-system subcontractors; a third party may include, without limitation, any number of vendors, subcontractors, and suppliers; and an operator may be an airline, leasing company, military entity, service organization, and so on.

As shown in FIG. 11B, aircraft 1102 produced by illustrative method 1100 may include airframe 1118 with a plurality of high-level systems 1120 and interior 1122. Examples of high-level systems 1120 include one or more of propulsion system 1124, electrical system 1126, hydraulic system 1128, and environmental system 1130. Any number of other systems may be included. Although an aerospace example is shown, the principles disclosed herein may be applied to other industries, such as the automotive industry. Accordingly, in addition to aircraft 1102, the principles disclosed herein may apply to other vehicles, e.g., land vehicles, marine vehicles, space vehicles, etc.

Apparatus(es) and method(s) shown or described herein may be employed during any one or more of the stages of the manufacturing and service method 1100. For example, components or subassemblies corresponding to component and subassembly manufacturing (block 1108) may be fabricated or manufactured in a manner similar to components or subassemblies produced while aircraft 1102 is in service (block 1114). Also, one or more examples of the apparatus(es), method(s), or combination thereof may be utilized during production stages 1108 and 1110, for example, by substantially expediting assembly of or reducing the cost of aircraft 1102. Similarly, one or more examples of the apparatus or method realizations, or a combination thereof, may be utilized, for example and without limitation, while aircraft 1102 is in service (block 1114) and/or during maintenance and service (block 1116).

Different examples of the system(s) and method(s) disclosed herein include a variety of components, features, and functionalities. It should be understood that the various examples of the system(s) and method(s) disclosed herein may include any of the components, features, and functionalities of any of the other examples of the system(s) and method(s) disclosed herein in any combination, and all of such possibilities are intended to be within the scope of the present disclosure.

Many modifications of examples set forth herein will come to mind to one skilled in the art to which the present disclosure pertains having the benefit of the teachings presented in the foregoing descriptions and the associated drawings.

Therefore, it is to be understood that the present disclosure is not to be limited to the specific examples illustrated and that modifications and other examples are intended to be included within the scope of the appended claims. Moreover, although the foregoing description and the associated drawings describe examples of the present disclosure in the context of certain illustrative combinations of elements and/or functions, it should be appreciated that different combinations of elements and/or functions may be provided by alternative implementations without departing from the scope of the appended claims. Accordingly, parenthetical reference numerals in the appended claims are presented for illustrative purposes only and are not intended to limit the scope of the claimed subject matter to the specific examples provided in the present disclosure.

What is claimed is:

1. A method of generating a path for processing a physical profile of a part, the physical profile having a shape, the method comprising:
   detecting a first processing location on the physical profile of the part using a detector of an inspection machine, wherein the first processing location is within a first inspection region;
   identifying a second inspection-region location based on the first processing location, wherein a second inspection region is geometrically associated with the second inspection-region location and the first inspection region and the second inspection region do not overlap;
   moving at least a portion of the inspection machine such that a field of view of the detector moves from the first inspection region to the second inspection region;
   detecting a second processing location on the physical profile of the part using the detector of the inspection machine, wherein the second processing location is within the second inspection region; and
   generating at least a portion of the path based on the first processing location and the second processing location.

2. The method according to claim 1, wherein the first inspection region is geometrically associated with a first inspection-region location, which is identified based on pre-existing data related to the shape of the physical profile of the part.

3. The method according to claim 1, wherein, to detect the first processing location on the physical profile of the part, an emitter of the inspection machine generates a first indicator that extends through the first inspection region and across the physical profile.

4. The method according to claim 1, wherein, to detect the second processing location on the physical profile of the part, an emitter of the inspection machine generates a second indicator that extends through the second inspection region and across the physical profile.

5. The method according to claim 4, further comprising:
   identifying a third inspection-region location based on the second processing location, wherein a third inspection region is geometrically associated with the third inspection-region location;
   detecting a third processing location on the physical profile of the part, wherein the third processing location is within the third inspection region, and
   generating at least the portion of the path also based on the third processing location.

6. The method according to claim 5, wherein, to detect the third processing location on the physical profile of the part, the emitter generates a third indicator that extends through the third inspection region and across the physical profile.

7. The method according to claim 5, wherein a distance between the first processing location and the second processing location is equal to a distance between the second processing location and the third processing location.

8. The method according to claim 5, wherein a distance between the first processing location and the second processing location is different than a distance between the second processing location and the third processing location.

9. The method according to claim 5, wherein an angle between the first indicator and the second indicator is different than an angle between the second indicator and the third indicator.

10. The method according to claim 5,
    wherein the third inspection-region location is identified based on both the first processing location and the second processing location, and
    wherein identifying the third inspection-region location based on the first processing location and the second processing location comprises applying a trending function to the first processing location and the second processing location.

11. The method according to claim 5, wherein the second inspection-region location is a preset distance away from the first processing location.

12. The method according to claim 11, wherein the preset distance is selected based on pre-existing data relating to the shape of the physical profile of the part.

13. The method according to claim 5, wherein the third inspection-region location is a preset distance away from the second processing location.

14. The method according to claim 13, wherein the preset distance is selected based on pre-existing data relating to the shape of the physical profile of the part.

15. The method according to claim 13, wherein the preset distance is selected based on applying a trending function to the first processing location and the second processing location.

16. The method according to claim 4, wherein the emitter generates the second indicator to be parallel with the first indicator.

17. The method according to claim 4, wherein the emitter generates the second indicator to be non-parallel with the first indicator.

18. The method according to claim 4, wherein the emitter generates the second indicator and the first indicator to be substantially perpendicular to the physical profile.

19. The method according to claim 10, wherein the trending function is a linear trending function.

20. The method according to claim 10, wherein the trending function is a non-linear trending function.

* * * * *